United States Patent
Percy-Hughes

(10) Patent No.: US 11,761,587 B1
(45) Date of Patent: Sep. 19, 2023

(54) MOBILE HYDROGEN STORAGE, TRANSPORTATION, AND REFUELING SYSTEM AND METHOD OF USING THE SAME

(71) Applicant: First Mode IPP Limited, London (GB)

(72) Inventor: James A. Percy-Hughes, Brisbane (AU)

(73) Assignee: First Mode IPP Limited, London (GB)

( * ) Notice: Subject to any disclaimer, the term of this patent is extended or adjusted under 35 U.S.C. 154(b) by 0 days.

(21) Appl. No.: 17/719,699

(22) Filed: Apr. 13, 2022

(51) Int. Cl.
    *F17C 7/00*     (2006.01)

(52) U.S. Cl.
CPC .......... *F17C 7/00* (2013.01); *F17C 2205/013* (2013.01); *F17C 2205/0107* (2013.01); *F17C 2221/012* (2013.01); *F17C 2223/036* (2013.01); *F17C 2227/0157* (2013.01); *F17C 2227/0337* (2013.01); *F17C 2265/065* (2013.01); *F17C 2270/0171* (2013.01)

(58) Field of Classification Search
CPC ................ F17C 7/00; F17C 2205/0107; F17C 2205/013; F17C 2221/012; F17C 2223/036; F17C 2227/0337; F17C 2227/0157; F17C 2265/065; F17C 2270/0171
USPC ....................................................... 141/11
See application file for complete search history.

(56) References Cited

U.S. PATENT DOCUMENTS

| | | | | |
|---|---|---|---|---|
| 6,745,801 | B1* | 6/2004 | Cohen | C01B 3/065 141/2 |
| 6,886,609 | B2* | 5/2005 | Cohen | C01B 3/065 141/2 |
| 8,006,627 | B1* | 8/2011 | Miller | B61C 7/04 105/49 |
| 2003/0189329 | A1* | 10/2003 | Smith | B62D 53/065 280/762 |

(Continued)

FOREIGN PATENT DOCUMENTS

| | | | | |
|---|---|---|---|---|
| DE | 102017214184 A1 | * | 2/2019 | ............. B60K 15/07 |
| GB | 2587666 A | * | 4/2021 | ............. B60L 50/75 |

OTHER PUBLICATIONS

DE-102017214184-A1 English Translation of Specification (Year: 2022).*

*Primary Examiner* — Timothy P. Kelly
*Assistant Examiner* — Stephanie A Shrieves
(74) *Attorney, Agent, or Firm* — COOLEY LLP

(57) ABSTRACT

An apparatus for mobile hydrogen refueling includes a heavy equipment vehicle having a size exceeding highway size constraints and a platform coupled to the vehicle. A hydrogen storage module and a compression module are removably coupleable to the platform. The storage module is configured to store a number of hydrogen tanks. The compression module is configured to compress a flow of hydrogen from a hydrogen tank in the storage module via a manifold to produce a flow of high-pressure hydrogen. A refueling interface is configured to engage a refueling interface of a hydrogen powerplant and to selectively convey a flow of high-pressure hydrogen from the compression mod- (Continued)

ule. In some implementations, the compression module can include a chiller configured to cool the high-pressure hydrogen provided to the refueling interface. In some implementations, a power module is configured to provide electric power to at least the compression module and/or the vehicle.

5 Claims, 13 Drawing Sheets

(56) References Cited

U.S. PATENT DOCUMENTS

| | | | |
|---|---|---|---|
| 2004/0163731 A1* | 8/2004 | Eichelberger | F17C 1/00 141/284 |
| 2006/0118201 A1* | 6/2006 | Li | F17C 11/005 141/231 |
| 2014/0102587 A1* | 4/2014 | Nagura | B60L 58/40 141/69 |
| 2015/0240996 A1* | 8/2015 | Kapoor | F17C 1/00 137/565.17 |
| 2016/0146401 A1* | 5/2016 | Leachman | F17C 5/007 141/35 |
| 2017/0130901 A1* | 5/2017 | Sloan | F17C 5/06 |
| 2018/0073679 A1* | 3/2018 | Roberge | F17C 13/025 |

* cited by examiner

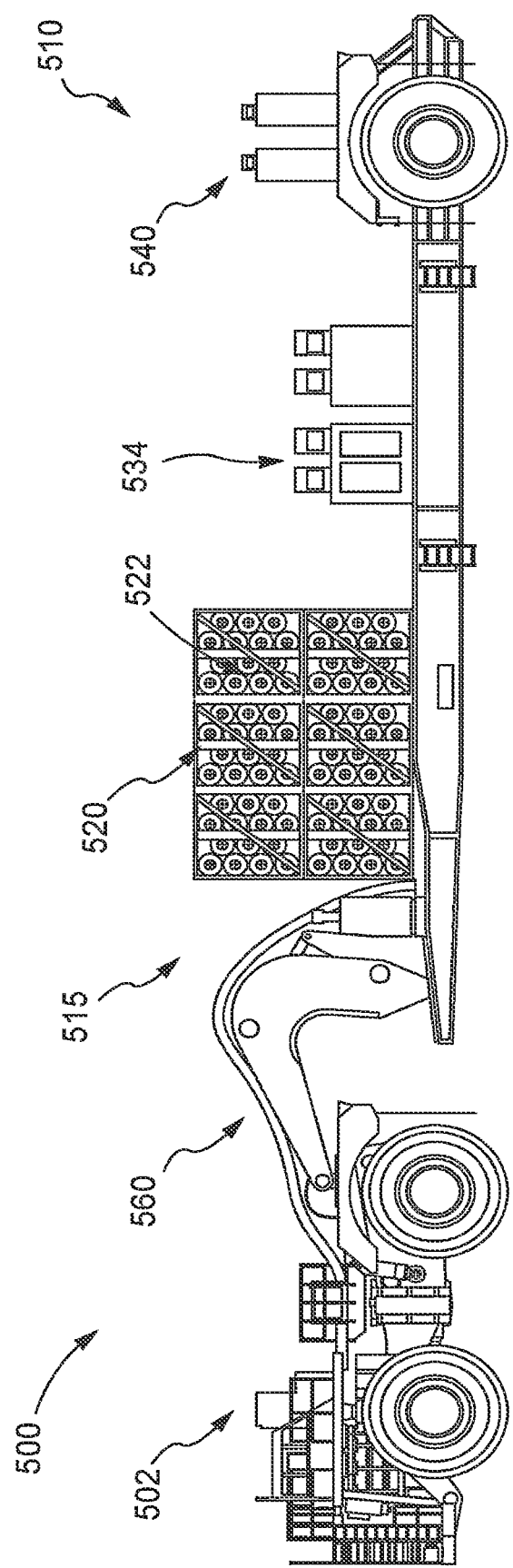

US 11,761,587 B1

MOBILE HYDROGEN STORAGE, TRANSPORTATION, AND REFUELING SYSTEM AND METHOD OF USING THE SAME

BACKGROUND

Embodiments described herein are related to hydrogen refueling systems and more particularly, to systems and methods for mobile hydrogen storage, transportation, and refueling that are, for example, suitable in large-scale industrial applications.

Despite contributing to harmful anthropogenic greenhouse gas emissions, the energy source for the most vehicles continues to be the burning of fossil fuels in internal combustion engines. In an effort to abate greenhouse gas emissions, considerable attention has been directed to the use of alternative and/or renewable energy sources in certain consumer and/or commercial vehicles. One such alternative energy source is hydrogen-powered fuel cells. In some instances, hydrogen power may be particularly attractive based at least in part on it being a virtually unlimited energy source, the ability to use renewable energy to produce hydrogen (e.g., "green" hydrogen), the primary by-product of using hydrogen being water, and/or the like.

Certain challenges continue to hinder wide adoption of hydrogen as an alternative energy source. For example, one such challenge is providing a hydrogen infrastructure that allows for storage and/or distribution having a level of convenience on par with current fossil fuel infrastructures. Some known systems and/or methods attempt to address the challenges associated with storing, transporting, and distributing hydrogen. For example, some such known solutions include using specialized tankers and/or trailers to transport pressurized cylinders/tubes of hydrogen.

Additional challenges of providing a hydrogen infrastructure arise when scaling to large industrial applications. For example, one such large-scale application is the mining industry. In some instances, hydrogen-powered fuel cells may replace large diesel engines typically used in very large mining vehicles. In such applications, known road-going hydrogen tankers and/or trailers may be unsuitable due to physical size restrictions associated with highway travel, etc. For example, some known high-capacity trailers are capable of transporting up to 1,100 kilograms (kg) of hydrogen, which is an amount of hydrogen consumed by just two mining vehicles in as little as a 24-hour period—this capacity is too small to be feasible for large scale mining operations with many vehicles and can increase safety risks associated with collision and/or interaction. Road-going hydrogen tankers and/or trailers are also unsuitable for movement around the rough terrain, undeveloped surfaces, and/or steep grades of a typical mine site, and would require preparation of smooth surfaced, shallower grade roadways for movement around the site. Moreover, the use of permanent and/or fixed storage and dispensing equipment, pipelines, and/or other high-volume hydrogen supplies may inhibit mine development and/or operational flexibility, or by their nature, be expensive to install and/or relocate.

Accordingly, a need exists for systems and methods for mobile hydrogen storage, transportation, and refueling suitable for large-scale industrial applications.

SUMMARY

Embodiments described herein are related to mobile hydrogen refueling systems and methods used, for example, in large-scale industrial applications. In some embodiments, an apparatus for mobile hydrogen refueling includes a heavy equipment vehicle having a size exceeding highway size constraints and a platform coupled to the vehicle. A hydrogen storage module and a compression module are removably coupleable to the platform. The storage module is configured to store any number of hydrogen tanks. The compression module is configured to receive a flow of hydrogen from a hydrogen tank in the storage module via a manifold and to compress the flow of hydrogen to produce a flow of high-pressure hydrogen. A refueling interface is configured to engage a refueling interface of a hydrogen powerplant and to selectively convey a flow of high-pressure hydrogen from the compression module. In some implementations, the compression module can include a chiller fluidically coupled between a compressor and the refueling interface and can be configured to cool the high-pressure hydrogen provided to the refueling interface. In some implementations, a power module is configured to provide electric power to at least the compression module. In some implementations, the power module can also provide electric power to one or more portions of the vehicle.

BRIEF DESCRIPTION OF THE DRAWINGS

FIG. 5 is a side view illustration of a mobile hydrogen refueling system according to an embodiment.

DETAILED DESCRIPTION

Figure 1A:
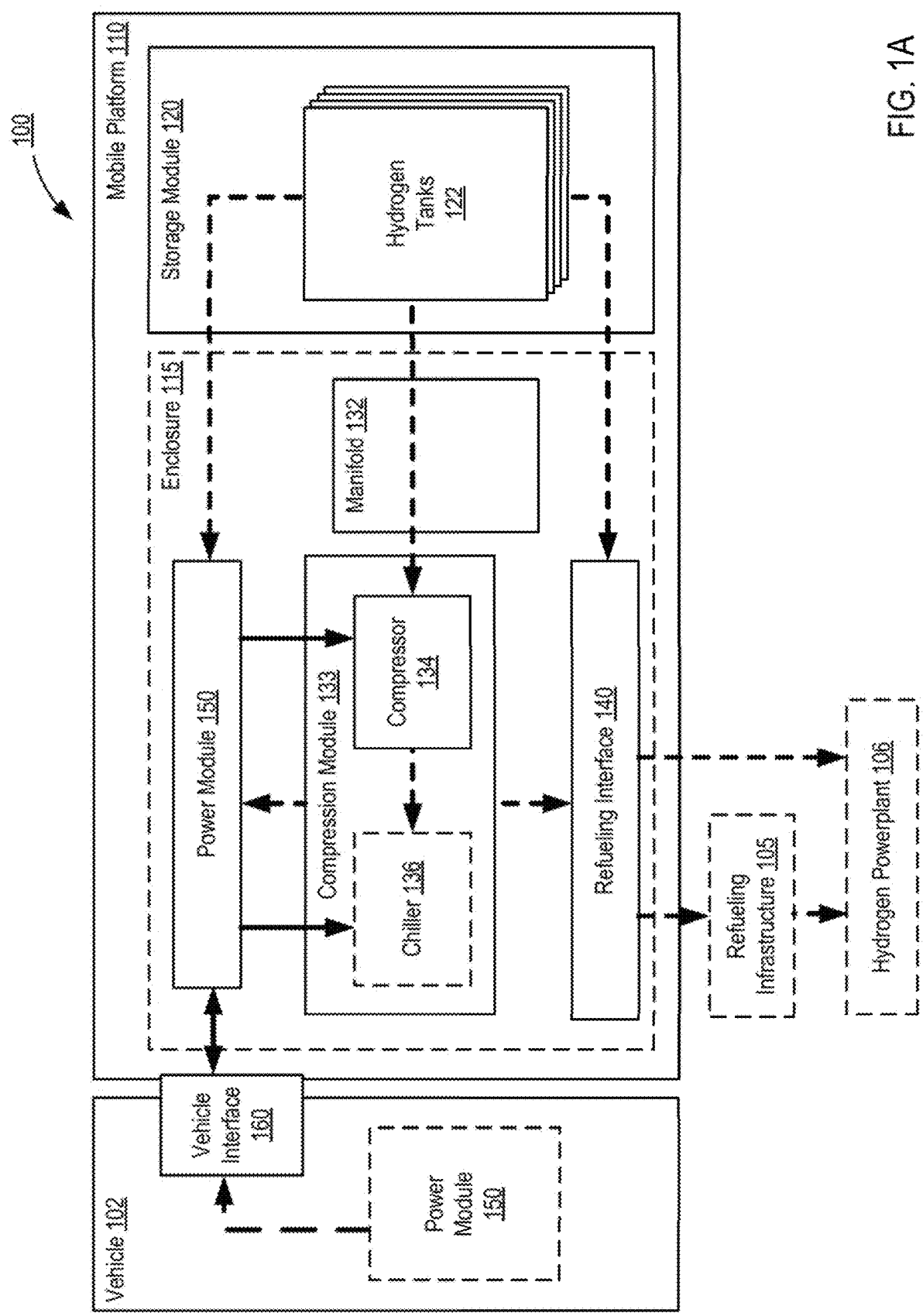
FIG. 1A is a schematic illustration of a mobile hydrogen refueling system according to an embodiment and shown in a first implementation.

In some embodiments, an apparatus for mobile hydrogen refueling includes a heavy equipment vehicle having a size exceeding highway size constraints and a platform coupled to the vehicle. A hydrogen storage module and a compression module are removably coupleable to the platform. The storage module is configured to store any number of hydrogen tanks. The compression module is configured to receive a flow of hydrogen from a hydrogen tank in the storage module via a manifold and to compress the flow of hydrogen to produce a flow of high-pressure hydrogen. A refueling interface is configured to engage a refueling interface of a hydrogen powerplant and to selectively convey a flow of high-pressure hydrogen from the compression module. In some implementations, the compression module can include a chiller fluidically coupled between a compressor and the refueling interface and can be configured to cool the high-pressure hydrogen provided to the refueling interface. In some implementations, a power module is configured to provide electric power to at least the compression module. In some implementations, the power module can also provide electric power to one or more portions of the vehicle.

In some embodiments, a system includes a plurality of refueling locations at a mining site, a plurality of mining vehicles, and a mobile hydrogen refueling platform. The mining site includes multiple work locations at which one or more of the mining vehicles may perform work and between which one or more of the mining vehicles may travel while on-cycle. Such work locations can include an in-pit loading area, overburden dumping area, ore processing area and stockpile(s), and/or the like. Each refueling location is within a predetermined distance from one of the active work locations at the mining site. The mining vehicles include a hydrogen powerplant and are operated in part at an active work location at the mine site. The mobile hydrogen refueling platform is movable to or from at least one of the refueling locations. The refueling platform includes at least a storage module and a refueling interface. The storage module is configured to store multiple hydrogen tanks having a combined capacity greater than the hydrogen fuel consumption of two mining vehicles within a 24-hour period, for example, greater than 1,000 kg or more (e.g., 1,500 kg, 2,000 kg, 2,500 kg, 3,000 kg, 3,500 kg, 4,000 kg, 4,500 kg, 5,000 kg, 5,500 kg, 6,000 kg, 6,500 kg, 7,000 kg, 7,500 kg, 8,000 kg, 8,500 kg, 9,000 kg, 9,500 kg, or 10,000 kg, inclusive, or higher). Each hydrogen tank stores hydrogen at a first pressure. The refueling interface is configured to engage the refueling infrastructure to convey a flow of hydrogen from a hydrogen tank in the storage module to the refueling infrastructure when a mining vehicle is coupled to the refueling infrastructure. The flow of hydrogen selectively has a second pressure greater than the first pressure.

In some embodiments, a method includes loading a storage module including a plurality of hydrogen tanks on a mobile hydrogen refueling platform. The mobile hydrogen refueling platform has a size that exceeds at least one constraint associated with traveling on a highway. A first flow of hydrogen is conveyed, via a manifold, from a hydrogen tank in the storage module. The first flow of hydrogen is compressed and cooled to produce cooled, high-pressure hydrogen. The cooled, high-pressure hydrogen is conveyed to a refueling interface of the mobile hydrogen refueling platform and a second flow of hydrogen is conveyed from the refueling interface to a refueling interface of a hydrogen powerplant included in a heavy equipment vehicle. In some implementations, the second flow of hydrogen can have a volumetric flow rate of at least 4 kg/min.

The terminology used herein is for the purpose of describing particular embodiments only and is not intended to limit the full scope of any embodiment and/or the full scope of the claims. Unless defined otherwise, all technical, industrial, and/or scientific terms used herein are intended to have the same meaning as commonly understood by one of ordinary skill in the art.

As used herein, the singular forms "a," "an," and "the" are intended to include the plural forms as well, unless the context clearly indicates otherwise. With respect to the use of singular and/or plural terms herein, those having skill in the art can translate from the singular to the plurality and/or vice versa as is appropriate for the context and/or application. Furthermore, any reference herein to a singular component, feature, aspect, etc. is not intended to imply the exclusion of more than one such component, feature, aspect, etc. (and/or vice versa) unless expressly stated otherwise.

In general, terms used herein and in the appended claims are generally intended as "open" terms unless expressly stated otherwise. For example, the term "including" should be interpreted as "including but not limited to," the term "having" should be interpreted as "having at least," etc. Similarly, the term "comprising" may specify the presence of stated features, elements, components, integers (or fractions thereof), steps, operations, and/or the like but does not preclude the presence or addition of one or more other features, elements, components, integers (or fractions thereof), steps, operations, and/or the like unless such combinations are otherwise mutually exclusive.

As used herein the term "and/or" includes any and all combinations of one or more of the associated listed items. It should be understood that any suitable disjunctive word and/or phrase presenting two or more alternative terms, whether in the written description or claims, contemplate the possibilities of including one of the terms, either of the terms, or both terms. For example, the phrase "A and/or B" will be understood to include the possibilities of "A" alone, "B" alone, or a combination of "A and B."

All ranges described herein include each individual member or value and are intended to encompass any and all possible subranges and combinations of subranges thereof unless expressly stated otherwise. Any listed range should be recognized as sufficiently describing and enabling the same range being broken down into at least equal subparts unless expressly stated otherwise.

Embodiments described herein relate generally to refueling hydrogen powerplants (e.g., the fuel cells thereof) in large-scale, industrial applications. As will be understood, scaling from some known high-capacity hydrogen refueling solutions to a size suitable for large-scale industrial applications presents many challenges and requires, for example, more than merely selecting components with larger sizes, capacities, etc. For example, embodiments described herein can be used to provide hydrogen fuel to hydrogen powerplant(s) included in heavy, industrial equipment and/or vehicles such as mining trucks, earthmovers, etc. In general, the size of such equipment and/or vehicles far exceeds size constraints associated with traveling on roadways. Moreover, each hydrogen powerplant included in such equipment and/or vehicles can produce between about 1-3 megawatts (MW) or more of electric energy, requiring very large hydrogen storage. In this context, a need exists for hydrogen refueling systems and methods capable of supplying meaningful amounts of hydrogen to such large-scale applications.

The embodiments and methods described herein can provide hydrogen refueling for any suitable large-scale industry. For example, one such industry is mining. In some implementations, any of the systems and/or methods described herein can be configured to operate at a mining site, including the ability to move around rough, unfinished, and/or steep surfaces typically found at a mining site. While embodiments and/or methods may be described herein as being implemented in and/or for the mining industry, it should be understood that such an implementation is provided by way of example only and not limitation. Any of the embodiments and/or methods described herein can be used in any suitable industry including, but not limited to the rail industry, the shipping/cargo industry, the aerospace industry, the large-scale construction/fabrication industry (e.g., of large ocean vessels, etc.), and/or any other suitable industry.

In some embodiments, the systems and methods described herein may be configured to have a hydrogen storage and/or delivery capacity enabling greater utilization of hydrogen-powered equipment such as mining haul trucks than are otherwise possible using known hydrogen storage and/or delivery systems. In some implementations, for example, the systems and methods described herein can support continuous or substantially continuous use of hydrogen-powered equipment, 24 hours a day, 7 days a week. In some implementations, the systems and methods described herein can support utilization of hydrogen-powered equipment of greater than about 80% utilization within a period of 24 hours of continuous or substantially continuous use (e.g., total available capacity minus non-active or non-value-adding use like time associated with refueling, crew changes, and/or other inefficiencies). In some embodiments, any of the systems and methods described herein may enable storage of hydrogen at a higher pressure than a hydrogen storage pressure of the hydrogen power plants being refueled such that hydrogen refueling may be performed via cascade filing that allows faster filling and reduces safety risks.

Referring now to the drawings, FIG. 1A is a schematic illustration of a mobile hydrogen refueling system 100 according to an embodiment. The mobile hydrogen refueling system 100 ("system") can be any suitable system configured to store and distribute a quantity of hydrogen fuel that meets a demand of large-scale industries such as, for example, the mining industry, the rail industry, the shipping/cargo industry, the aerospace industry, the large-scale fabrication industry, and/or the like. In addition, the system 100 is mobile allowing it to be moved between sites (e.g., mining sites) and/or work areas at a given site (e.g., different work areas at a mining site). In some embodiments, the system 100 can be designed for operation in rough, uneven, unpaved, and/or steep environments such as those encountered at mining sites or other heavy industrial work sites (e.g., the system 100 can be "ruggedized"). In some embodiments, the system 100 can be a modular and/or can include components that are modular, allowing components to be loaded, unloaded, serviced, replaced, etc. as needed or desired. In some implementations, the system 100 and/or one or more components thereof can be configured for autonomous or at least semi-autonomous operation.

As shown in FIG. 1A and as described in further detail herein, the system 100 is configured to store, transport, and/or distribute a flow of hydrogen gas to one or more refueling infrastructures 105 and/or one or more hydrogen powerplants 106. For example, the refueling infrastructure 105 can be and/or can be included in a refueling location or the like at an industrial site such as, for example, a mining site, a rail yard, a shipyard, and/or other sites at which large-scale hydrogen powered equipment may be operated. In some implementations, the refueling infrastructure 105 can include one or more storage tanks or the like configured to receive a flow of hydrogen gas from the system 100. In other implementations, the refueling infrastructure 105 can be one or more components allowing engagement between a refueling interface of the system 100 and a refueling interface of one or more hydrogen powerplants 106. The hydrogen powerplants 106 can be, for example, a hydrogen powerplant of heavy, industrial equipment and/or vehicles. In some implementations, the hydrogen powerplant 106 can be included in and/or can power large industrial vehicles such as mining trucks, earthmovers, etc. In some implementations, the hydrogen powerplant 106 can be capable of producing between about 1-3 MW or more of electric energy, which in turn, can require very large hydrogen storage tanks or the like. Accordingly, the system 100 is configured to store, transport, and/or distribute large quantities of hydrogen gas/fuel suitable for such large-scale applications.

As shown, the system 100 includes a mobile platform 110 that is coupleable to a heavy equipment vehicle 102 via a vehicle interface 160. The mobile platform 110 includes, supports, and/or is coupled to at least one storage module 120, at least one manifold 132, at least one compression module 133, a refueling interface 140, and at least one power module 150. The storage module 120 can be configured to store any number of hydrogen tanks 122 (e.g., tanks, tubes, canisters, etc.). The one or more manifolds 132 allow the compression module 133 to interface with the storage module 120. The compression module 133 can include at least one compressor 134 that is configured to produce a flow of high-pressure hydrogen. In some implementations, the compression module 133 may also include at least one chiller 136, which can cool the flow of high-pressure hydrogen from the compression 134. As such, the mobile platform 110 selectively can provide a flow of cooled, high-pressure hydrogen for distribution via the refueling interface 140. In some implementations, the refueling interface 140 can be configured to engage a refueling infrastructure 105 found, for example, at an operation site such as, for example, a mining site. In addition or as an alternative, the refueling interface 140 can be configured to engage a refueling interface corresponding to a hydrogen powerplant 106 such as, for example, hydrogen fuel cells of a hydrogen powerplant included in a mining truck or other equipment.

The mobile platform 110 can be any suitable shape, size, and/or configuration. For example, the mobile platform 110 can have a size that exceeds one or more constraints associated with roadway travel. As such, the mobile platform 110 is suitable for large-scale applications, where such size constraints are not encountered. In some embodiments, the mobile platform 110 can be a trailer or the like that can be coupled to the vehicle 102 via the vehicle interface 160. For example, while not shown in FIG. 1A, the mobile platform 110 can include a set of wheels that are coupled to a platform, bed, etc., which in turn, supports the modules, components, and/or the like coupled thereto.

Figure 2:
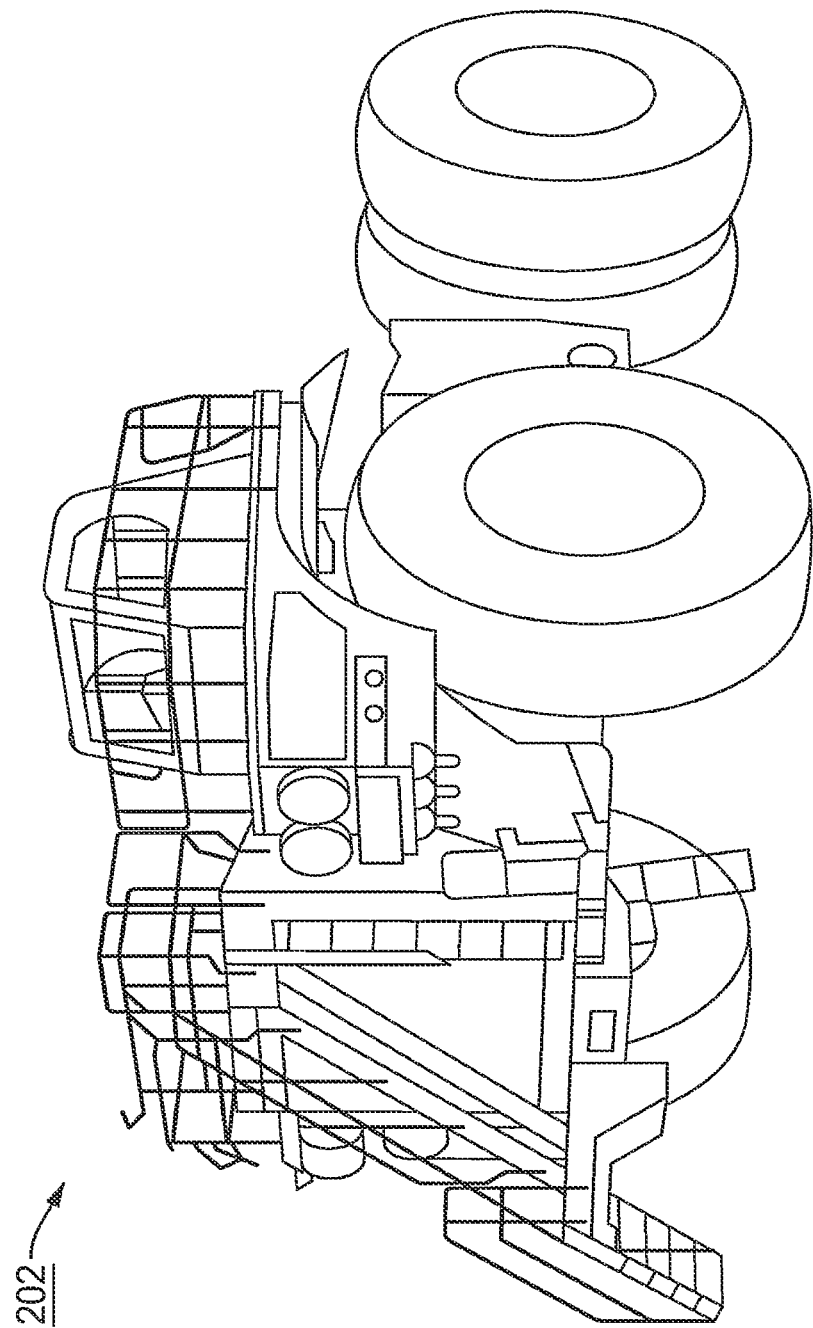
FIG. 2 is a perspective view of a known heavy equipment vehicle such as a mining truck.

The vehicle interface 160 can be, for example, a gooseneck hitch and/or other heavy-duty connection. Such a vehicle interface 160 can allow the mobile platform 110 to be connected to/disconnected from the vehicle 102. In some implementations, for example, the vehicle 102 can be an industrial, heavy-duty vehicle (e.g., also referred to as "heavy equipment vehicle"), and/or the like, such as a mining truck or the like. As such, the vehicle 102 can be significantly larger than conventional vehicles (e.g., semi-trucks or other vehicles capable of highway travel) used with some known mobile hydrogen refueling systems. For example, FIG. 2 is perspective view of a known heavy equipment vehicle 202, which may be used as the vehicle 102. More particularly, the vehicle 202 shown in FIG. 2 is a known mining haul truck produced by Caterpillar Inc., Deerfield, Ill., USA (e.g., a CAT 797F). In other implementations, the vehicle 102 can be any other suitable heavy equipment vehicle (e.g., any suitable known or modified mining haul truck and/or the like). In some embodiments, the vehicle 102 may be rated at a horsepower of greater than about 2,000 horsepower (HP) (e.g., about 2,500 HP, 3,000 HP, 3,500 HP, 4,000 HP, 4,500 HP, 5,000 HP, 5,500 HP or 6,000 HP, inclusive, or more), and a hauling capacity of greater than about 135 metric tons (tonnes) (e.g., 150 tonnes, 200 tonnes, 250 tonnes, 300 tonnes, tonnes, 400 tonnes, 450 tonnes, inclusive, or more).

As such, the vehicle interface 160 can include any suitable component and/or can have any suitable configuration that allows the mobile platform 110 to interface and/or couple to the vehicle 102. In some implementations, the vehicle interface 160 can be a physical interface as well as any other suitable interface such as an electrical and/or electronic interface. For example, such a vehicle interface 160 can provide an electric interface allowing electric power to be transferred between the vehicle 102 and the mobile platform 110. In other implementations, the vehicle interface 160 can be a platform, bed, and/or structure that is mounted to the chassis or other portion of the vehicle 102 (e.g., the mobile platform 110 is integrated with the vehicle 102), as described in further detail herein with reference to FIG. 1B.

Although not shown in FIG. 1A, the mobile platform 110 can include one or more features and/or structures that allow a modular arrangement and/or coupling between the mobile platform 110 and the storage module 120, the compression module 133, the power module 150, and/or any other suitable component, or subcomponent thereof. For example, in some embodiments, the mobile platform 110 can include rails, tracks, couplers, connectors, interfaces, etc. that are designed to removably engage one or more of the components and/or modules. In some implementations, the modular arrangement of the mobile platform 110 can allow any of the modules and/or components to be loaded, unloaded, serviced, replaced, etc. as needed or desired. In some implementations, the modular arrangement of the mobile platform 110 can allow for "hot swapping" of any of the modules and/or components (e.g., an exchange of modules without necessarily interrupting the operation of other modules).

In some embodiments, a modular arrangement can allow a mobile platform 110 to be configured with specific components and/or modules based at least in part on the conditions at a deployment/work site. For example, a mobile platform 110 configured to be deployed in a hot, desert environment may include components and/or modules such as extra chillers or the like that may not be desirable for a mobile platform 110 configured for deployment in a cold, artic or tundra environment. In some implementations, the mobile platform 110 can be configured with specific components and/or modules based at least in part on a desired use of the mobile platform 110. For example, in some implementations, a mobile platform 110 can be configured to provide maximum hydrogen storage and therefore, can include a large storage module that can store a large number of hydrogen tanks and/or can include multiple storage modules (that can replace other components such as the compressor 134, chiller 136, etc. of the compression module 133, and/or the like). In some instances, for example, such a configuration can be suitable for a mobile platform that is designed to refuel other mobile platforms, as described in further detail herein with reference to FIG. 1C.

Optionally, the mobile platform 110 can further include an enclosure 115. The enclosure 115 can be any suitable structure configured to enclose, house, cover, etc. one or more component and/or module of the mobile platform 110. For example, as shown in FIG. 1A, the manifold 132, the compression module 133 (e.g., the compressor 134 and/or the chiller 136 thereof), and the power module 150 can be at least partially disposed in the enclosure 115. In such implementations, it may be unnecessary or undesirable to include the storage module 120 in the enclosure 115. In other implementations, each of the modules and/or components of the mobile platform 110 can be disposed in the enclosure 115. As such, the enclosure 115 can, for example, enclose and/or protect one or more modules and/or components of the mobile platform 110 from an environment external to the enclosure 115. In some embodiments, the enclosure 115 can be insulated or at least partially insulated, which in turn, can insulate one or more module and/or components of the mobile platform 110 being operated in a hot environment or a cold environment.

The mobile platform 110 can include any number of storage modules 120. The storage module 120 can be any suitable shape, size, and/or configuration. For example, in some embodiments, the storage module 120 can be a single integrated frame structure or the like configured to store any number of the hydrogen tanks 122. In other embodiments, the storage module 120 can include and/or can be formed of any number of frame structures. Said another way, the mobile platform 110 can be coupled to and/or can include a single storage module 120 configured to store any number of the hydrogen tanks 122 or can be coupled to and/or can include multiple storage modules 120, each of which store any number of hydrogen tanks 122. In embodiments with multiple storage modules 120, the frames, structures, etc. of each module 120 can be similar or can be varied. In some embodiments, the storage modules 120 can include an open frame structure or the like designed to contain and/or immobilize the hydrogen tanks 122. In other embodiments, the storage modules 120 can include a closed structure similar to and/or substantially the same as, for example, an intermodal container and/or the like. In such embodiments, the storage modules 120 can enclose the hydrogen tanks 122 to, for example, protect the hydrogen tanks 122 from conditions outside of the intermodal container (e.g., weather, sunlight, potential debris, etc.).

The storage module 120 can be configured to store and/or contain any number of hydrogen tanks 122. The hydrogen tanks 122 can be any suitable shape, size, and/or configuration. In some embodiments, the hydrogen tanks 122 can be large pressure vessels configured to contain a compressed gas or a liquid (i.e., hydrogen). In some embodiments, the hydrogen tanks 122 can be similar to known tanks configured to store compressed hydrogen for typical or conventional use cases. In other embodiments, the hydrogen tanks 122 can be specialized tanks having a greater size and/or configured to store a greater volume of hydrogen or to store a volume of hydrogen at a greater pressure than known tanks. In some implementations, the amount of hydrogen stored by the hydrogen tanks 122 in the storage module can be much greater than an amount of hydrogen stored by some known high-capacity hydrogen tank (or "tube") trailers. For example, some known high-capacity tube trailers are capable of transporting up to 1,100 kilograms (kg) of hydrogen, which is an amount of hydrogen fuel consumed by just two mining vehicles in as little as a 24-hour period. In contrast, the hydrogen tanks 122 stored by the storage module 120 can collectively contain, for example, at least about 2,000 kg of hydrogen. In some implementations, the storage module 120 can collectively contain at least about 3,000 kg of hydrogen, at least about 5,000 kg of hydrogen, at least about 10,000 kg of hydrogen, at least about 15,000 kg of hydrogen, or more (inclusive of any amount or range therebetween).

In some implementations, such a storage capacity can be based at least in part on, for example, a number of hydrogen tanks 122 stored, a size or storage capacity of the hydrogen tank(s) 122, and/or a combination thereof. In some implementations, the storage module 120 may include a single module (e.g., a single high-capacity tube trailer) that contains, houses, or stores each of the hydrogen tanks 122. In some implementations, the storage module 120 may include multiple submodules that are coupled, linked, and/or stacked together. For example, the submodules may include and/or can be similar to some known high-capacity tube trailers having a size (e.g., length) of about 20 feet (ft), 40 ft, and/or the like. In some implementations, any combination of smaller or larger storage submodules may be included in the storage module 120. In certain implementations, the submodules may include and/or can be similar to some known 20 ft or 40 ft trailers that may include smaller subassemblies (e.g., racks, shelves, housings, etc.), each of which store a set of one or more of the hydrogen tanks 122.

As described above, in some embodiments, the storage module 120 (and/or submodules thereof) can be and/or can have a modular configuration allowing the storage module 120 (and/or submodules thereof) to removably couple to the mobile platform 110. In some instances, such an arrangement can allow the storage module 120 (and/or one or more submodules thereof) to be replaced, for example, when the hydrogen tanks 122 are running low or drop below a threshold quantity, pressure, etc. In some implementations, the mobile platform 110 can provide an indication of the amount, pressure, and/or fill level of the hydrogen tanks 122 in the storage module 120. In some implementations, the replacement of the storage module 120 (e.g., replacing an empty or nearly empty module with a full module) can be performed in an autonomous or at least semi-autonomous process.

The manifold(s) 132 can be any suitable shape, size, and/or configuration. For example, the manifold(s) 132 can be and/or can include any suitable structure configured to define one or more flow paths for hydrogen to flow between the storage module 120 and any suitable component of the mobile platform 110. In some embodiments, for example, the manifold 132 can include at least an inlet or inlet interface that can be in fluid communication with the storage module 120 (or at least one hydrogen tank 122 included therein), an outlet or outlet interface that can be in fluid communication with one or more components of the mobile platform 110, and one or more fluid flow paths between the inlet and outlet. In some implementations, such as the implementation shown in FIG. 1A, the manifold(s) 132 is/are configured to interface with the storage module 120 and/or one or more of the hydrogen tanks 122 stored therein to allow a flow of hydrogen to be selectively transferred from the storage module 120 to, for example, the compressor 134. In some implementations, the manifold(s) 132 is/are configured to allow a flow of hydrogen between the storage module 120 and, for example, the refueling interface 140 (e.g., bypassing the compressor 134 and/or chiller 136).

The mobile platform 110 can include a single manifold 132 or multiple manifolds 132. For example, in some implementations, the mobile platform 110 can include a single manifold 132 (or multiple manifolds 132 collectively forming a single flow path) that can engage the storage module 120 and/or one or more hydrogen tank 122 to provide a single stream or flow of hydrogen from the storage module 120 to one of the compressor 134, the refueling interface 140, or the power module 150. In other implementations, the mobile platform 110 can include multiple manifolds 132 (or a single manifold 132 with multiple flow paths), which can engage the storage module 120 and/or one or more of the hydrogen tanks 122 to provide a number of parallel streams or flows of hydrogen from the storage module 120 to the compressor 134, the refueling interface 140, the power module 150, and/or the like.

In some implementations, the manifold 132 may include one or more components configured to control or manage the flow of hydrogen between the storage module 120 and any suitable component of the mobile platform 110. For example, the manifold 132 may include a mechanical nozzle interface for receiving hydrogen from the storage module 120 and/or communicating the hydrogen to any suitable module of the mobile platform 110. In some implementations, the manifold 132 may include a controller (e.g., a digital controller such as a programmable logic unit) configured to control one or more operations of the manifold 132. In some implementations, the manifold 132 may include one or more safety valves, pressure sensors, and any other safety devices that are configured to be selectively activated or deactivated, for example, in response to detecting a pressure above a threshold pressure, or an activation signal received from the controller so as to inhibit damage or prevent failure. In some implementations, the controller can be human-operated (e.g., a human operator provides an input into the controller) or can be at least semi-autonomous (e.g., configured to perform any suitable process(es) based on an input from any suitable source such as sensors, interfaces, valves, etc., substantially with or without human operation.

The compression module 133 of the mobile platform 110 can be any suitable shape, size, and/or configuration, and/or can include any suitable component(s), subcomponent(s), etc. For example, the compression module 133 can be any suitable structure or the like that can include, house, contain, and/or couple (functionally and/or physically) any number of components. For example, in some implementations, the compression module 133 can be a modular storage structure or the like (e.g., similar to the storage module 120) that includes a number of components and that can be handled (e.g., loaded, unloaded, replaced, serviced, etc.) as an integrated or single assembly. In other embodiments, the compression module 133 can be an assembly of various components, each of which has a modular arrangement allowing that component to be handled relative to the other components of the compression module 133 and/or relative to the mobile platform 110 independently. In this manner, if a component of the compression module 133 requires maintenance, service, and/or replacement, such an arrangement can allow that component to be replaced substantially without impacting the operation of other components included in the compression module 133.

As shown in FIG. 1A, the compression module 133 can include at least one compressor 134. In some embodiments, the compression module 133 can also include at least one chiller 136 in communication with or configured to be placed in communication with the compressor 134. Although shown in FIG. 1A as being independent components, in some embodiments, the compression module 133 can also include the manifold(s) 132 and/or the refueling interface 140.

The compressor(s) 134 can be any suitable shape, size, and/or configuration. In some embodiments, the compressor 134 can be similar to and/or substantially the same as some know compressors configured to compress a gas. For example, in some embodiments, the compressor 134 may be and/or may include a diaphragm compressor, a rotary compressor, and/or the like configured to compress and pressurize hydrogen received from the hydrogen tanks 122. In some embodiments, the compressor 134 can be, for example, a high-pressure compressor configured to receive an input flow of a pressurized gas and to provide an output flow of compressed/high-pressure gas at a higher pressure than the input flow of gas. In some implementations, for example, the compressor 134 can receive a flow of hydrogen gas having a pressure between about 200 bar and 400 bar and can output a flow of high-pressure hydrogen gas (or liquid hydrogen) having a pressure between about 400 bar and 1,000 bar. As shown in FIG. 1A, the compressor 134 can be configured to provide an output flow of high-pressure hydrogen gas (or liquid hydrogen) to one or more chillers 136. Alternatively, the compression module 133 (or the compressor 134 thereof) can be configured to provide an output flow of high-pressure hydrogen gas (or liquid hydrogen) to one or more other components, modules, interfaces, etc. of the mobile platform 110. In some instances, a high-pressure flow of hydrogen may be desirable as it can be used to produce a flow of hydrogen having a relatively high volumetric flow rate (e.g., about 4 kg/min or compressed hydrogen gas), which in turn, can reduce refueling times and increase utilization of the equipment having the hydrogen powerplant 106.

In embodiments including multiple compressors 134, each of compressor 134 can be configured to receive a flow of hydrogen and to output a flow of high-pressure hydrogen. In some such embodiments, the compressors 134 can be operated in any number of parallel processes and each compressor 134 can be configured to provide an output flow of high-pressure hydrogen gas to a different component, subcomponent, or portion thereof (e.g., different chillers 136, different refueling interfaces 140 or different portions of the refueling interface, one or more power modules 150, and/or the like). Moreover, each of the compressors 134 may be configured to pressurize the hydrogen to the same pressure or to different pressures. In some instances, different compressors 134 can be configured to compress a hydrogen to different pressures, for example, corresponding to different desired inlet hydrogen pressures for various hydrogen power plants 106 (e.g., a desired inlet hydrogen pressure for the hydrogen power plant 106 of a relatively smaller vehicle may be different than a desired inlet hydrogen pressure for the hydrogen power plant 106 of a relatively larger vehicle, such as a large mining haul truck). In other embodiments, the compressors 134 can be operated in any number of parallel processes and each compressor 134 can be configured to provide an output flow of high-pressure hydrogen gas to a single component (e.g., a single chiller 136 or the refueling interface 140). For example, although not shown in FIG. 1A, in some such embodiments, a manifold or the like can receive multiple input flows of high-pressure hydrogen gas and can output a single flow of high-pressure hydrogen gas, which in turn, is provided to the refueling interface 140 or a single chiller 136 prior to being delivered to the refueling interface. In such embodiments, the manifold can be substantially similar to the manifold 132.

In some embodiments, the compression module 133 of the mobile platform 110 can also include any number of chillers 136. The chiller(s) 136 can be any suitable shape, size, and/or configuration. In some embodiments, the chiller 136 can be similar to and/or substantially the same as some known chillers configured to cool a flow or volume of fluid or gas. For example, in some embodiments, the chiller 136 can include a pump configured to transport a heat transfer fluid such as a refrigerant (e.g., R-22, R-290, R-134a, R-450A, etc.) between a location where the heat transfer fluid is in thermal contact with the hydrogen received from the compressor(s) 134 and a heat sink (e.g., a radiator) so as to remove heat from the hydrogen.

As shown in FIG. 1A, the chiller 136 may be configured to receive a flow of high-pressure hydrogen having a first temperature from the compressor 134 (or a manifold therebetween), and to deliver to the refueling interface 140 a flow of high-pressure hydrogen having a second temperature lower than the first temperature. In some instances, the chiller 136 can provide a flow of cooled high-pressure hydrogen to, for example, the refueling interface 140 and/or the power module 150. For example, the power module 150 can include a hydrogen powerplant similar to or substantially the same as the hydrogen powerplant 106. Thus, the chiller 136 can provide a flow of hydrogen that can refuel the power module 150 providing electric power to the mobile platform 110 (e.g., a self-contained, self-powered system). In some embodiments, the chiller 136 can be, for example, a gas chiller configured to receive an input flow of a pressurized gas, to cool the high-pressure gas substantially without changing a pressure thereof (e.g., an isobaric process), and to provide an output flow of cold, high-pressure gas at a lower temperature than a temperature of the input flow of gas.

For example, the ideal gas law is used to describe a relationship between pressure, volume, and temperature of a gas, provided below as equation 1:

$$PV = nRT \qquad \text{Equation 1}$$

where P is pressure, V is volume, T is temperature, n is an amount of the gas (in moles), and R is the ideal gas constant. Equation 2 below expresses the ideal gas law when comparing the same gas under two conditions:

$$\frac{P_1 V_1}{T_1} = \frac{P_2 V_2}{T_2} \qquad \text{Equation 2}$$

As such, cooling the hydrogen gas without substantially changing a pressure thereof results in a reduction of a volume of the gas. In other implementations, cooling the hydrogen gas can reduce each of the pressure and the volume. In such implementations, the pressure of the cooled hydrogen gas output by the chiller 136 can be greater than a pressure of the hydrogen gas provided to the compressor 134.

By way of example, the chiller 136 can receive from the compressor 134 a flow of hydrogen gas having a pressure between about 200 bar and 400 bar, inclusive of any values and/or ranges therebetween, and a temperature between about 0 degrees Celsius (° C.) and −80° C., inclusive of any values and/or ranges therebetween. The chiller 136 can cool the flow hydrogen gas and can provide to the refueling interface 140 an output flow of cooled, high-pressure hydrogen gas having a pressure between about 400 bar and 1000 bar, inclusive of any values and/or ranges therebetween, and a temperature between about 0° C. and −80° C., inclusive of any values and/or ranges therebetween. In some embodiments, the chiller 136 can be selected, designed, adjusted, and/or configured to provide to the refueling interface 140 (or the power module 150) a flow of hydrogen gas having any suitable pressure and/or temperature.

While the compression module 133 is described above as compressing hydrogen received from the storage module 120 and providing high-pressure and potentially cooled hydrogen to the refueling interface 140, power module 150, and/or any other suitable component of the mobile platform 110, in some instances, the compression module 133 can provide a flow of hydrogen substantially without compressing the hydrogen and/or substantially without cooling the hydrogen. For example, in some implementations, it may be desirable to provide a flow of hydrogen having a relatively low pressure. In instances in which the mobile platform 110 is used to refuel a relatively smaller vehicle having a relatively low hydrogen storage volume, a high volumetric flow rate otherwise associated with the high-pressure output may be unnecessary. As such, the compression module 133 can provide a flow of hydrogen that is not compressed or that is compressed to a lower pressure. In some other instances, the manifold 132 can be configured to bypass the compression module 133 and to direct a flow of lower pressure hydrogen directly to the desired component.

The mobile platform 110 can include one or more refueling interfaces 140. The refueling interface(s) 140 can be any suitable shape, size, and/or configuration. In some implementations, the refueling interface 140 can include one or more couplers, manifolds, hoses, nozzles, regulators, etc. configured to allow the refueling interface 140 to engage at least one of the refueling infrastructure 105 or a refueling interface of the hydrogen powerplant 106 and to transfer a flow of hydrogen gas thereto.

In some implementations, the refueling interface 140 can include any suitable component configured to allow a flow of hydrogen gas having a high flow rate suitable for transferring relatively large volumes of hydrogen gas to storage tanks or the like associated with at least one of the refueling infrastructure 105 and/or the hydrogen powerplant 106. Although not shown in FIG. 1A, in some implementations, the refueling interface 140 can be configured to provide a flow of hydrogen gas to the power module 150.

In some implementations, it may be desirable to transfer the hydrogen gas having at least a minimum flow rate of about 4 kg/min. Expanding further, some known high-capacity/high-flow hydrogen refueling systems can be configured to output a flow of hydrogen gas having a relatively limited volumetric flow rate. In the large-scale implementations described herein, however, such a flow rate can be insufficient and/or impracticable. Thus, in some implementations, the refueling interface 140 may be configured to provide a flow of hydrogen at a flow rate of greater than known hydrogen refueling systems (e.g., about 4 kg/min, 5 kg/min, 6 kg/min, 7 kg/min, 8 kg/min, 9 kg/min, 10 kg/min, 15 kg/min, 20 kg/min, 25 kg/min, 30 kg/min, or more), so as to allow rapid filling and/or refueling of the hydrogen powerplant 106.

The mobile platform 110 can include any number of power modules 150. The power module(s) 150 can be any suitable shape, size, and/or configuration. In some embodiments, the power module(s) 150 can have a modular configuration and/or the like allowing one or more power modules 150 to be handled relative to the mobile platform 110 independently. For example, in implementations including multiple power modules, if one power module 150 requires maintenance, service, and/or replacement, such an arrangement can allow that power module 150 to be replaced substantially without impacting the operation of other power modules 150 or other modules of the mobile platform 110.

In some embodiments, the power module 150 can be and/or can include, for example, one or more hydrogen powerplants similar to or substantially the same as the hydrogen powerplant 106. In such embodiments, for example, the power module 150 can be configured to receive a flow of hydrogen gas/fuel directly from the chiller 136 (or via a manifold or interface therebetween). In some implementations, the power module 150 can include a hydrogen tank similar to and/or substantially the same as one or more of the hydrogen tanks 122 included in the storage module 120. As such, the hydrogen tank can receive a flow of hydrogen gas/fuel from the chiller 136, the refueling interface 140, and/or the like and, in turn, can supply the power module 150 with the hydrogen gas/fuel. In some implementations, the power module 150 can receive a flow of hydrogen directly from one or more hydrogen tanks 122 in the storage module (or via a manifold or interface therebetween). In other embodiments, the power module 150 can be any suitable power generator other than a hydrogen powerplant.

The power module 150 is configured to provide electric power to at least the compressor(s) 134 and chiller(s) 136. In some implementations, the power module 150 can provide electric power to the storage module 120, the refueling interface 140, and/or the vehicle interface 160. In still other embodiments, the power module 150 can be configured to provide electric power to any other component, module, system, and/or the like. For example, in some implementations, a mobile platform 110 can be operated at a refueling location or the like at an industrial work site such as a mine site or the like. In some such implementations, the power module 150 can provide a flow of electric power operable to power one or more components of the refueling location (e.g., a lighting system, the refueling infrastructure 105, and/or any other components).

As shown in FIG. 1A, the power module 150 can provide or receive a flow of electric power to/from the vehicle interface 160. For example, in some implementations, the power module 150 can output a flow of electric power operable to electrically power one or more electric and/or electronic components of the vehicle interface 160. In addition or alternatively, the power module 150 can provide a flow of electric power to the vehicle 102 (via the vehicle interface 160) operable to electrically power the vehicle 102. That is to say, in some implementations, the vehicle 102 coupled to the mobile platform 110 can be electrically powered by the power module 150 of the mobile platform 110.

While the power module 150 is described as being included in and/or coupled to the mobile platform 110, in some embodiments, the power module 150 can be and/or can include a power module 150 included in and/or otherwise powering the vehicle 102, as shown in FIG. 1A. In such embodiments, the power module 150 of the vehicle 102 can be a hydrogen powerplant such as the hydrogen powerplant 106. In other embodiments, the power module 150 of the vehicle 102 can be any suitable power generator. In some implementations, the power module 150 of the vehicle 102 can provide a flow of electric power (via the vehicle interface 160) to the mobile platform 110 to power any of the modules and/or components thereof. In some implementations, the power module 150 of the mobile platform 110 can be, for example, an energy storage device such as one or more batteries, capacitors, etc. that can receive electric power from the power module 150 of the vehicle 102. In such implementations, the energy storage device can, in turn, provide electric power to the storage module 120, the compressor 134, the chiller 136, the refueling interface 140, the vehicle interface 160, and/or any other suitable component and/or module.

Figure 1B:
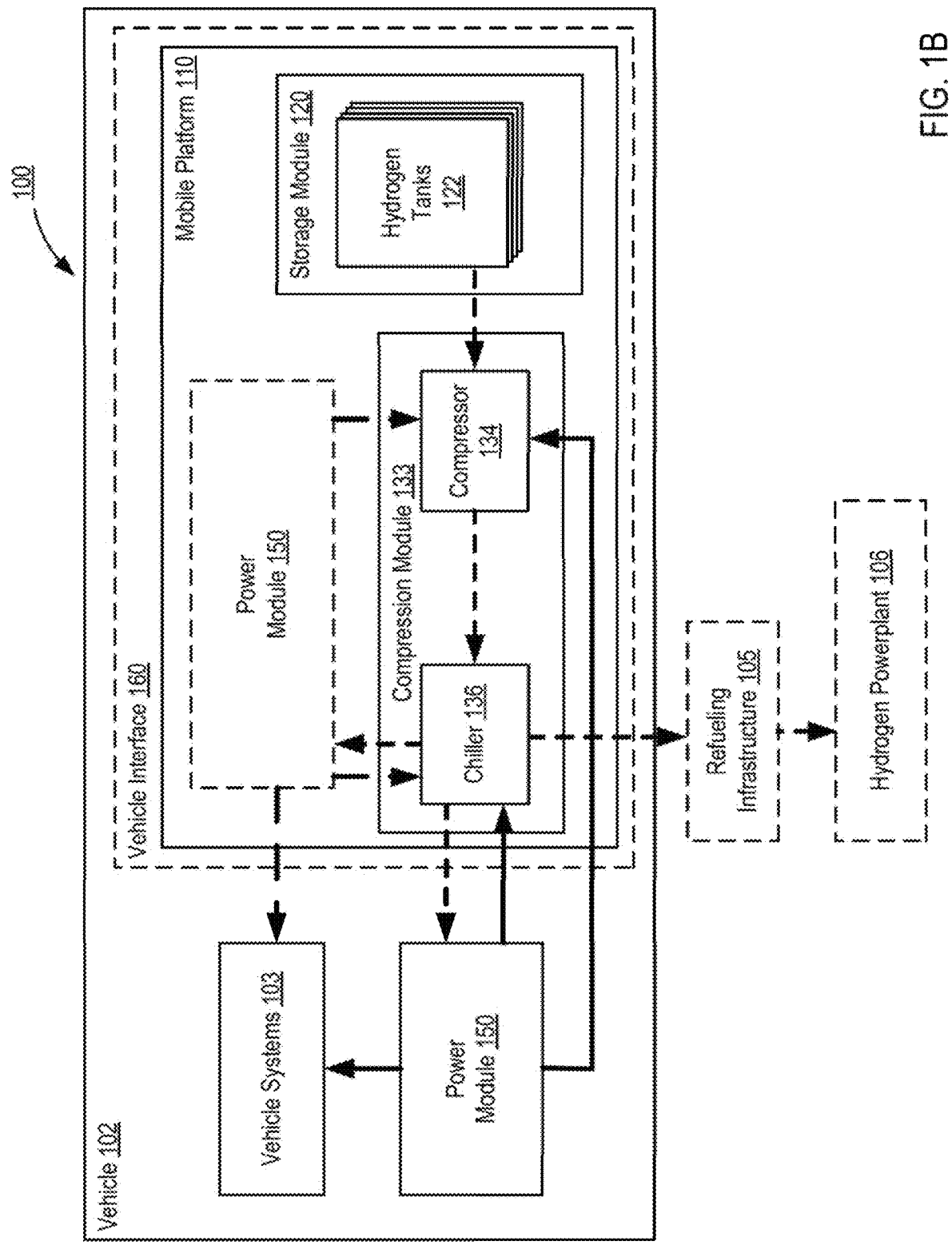
FIG. 1B is a schematic illustration of the mobile hydrogen refueling system of FIG. 1A shown in a second implementation.

FIG. 1B is a schematic illustration of the mobile hydrogen refueling system 100 of FIG. 1A shown in a second implementation. The implementation shown in FIG. 1B is substantially similar to the implementation shown in FIG. 1A with similar reference numerals depicting similar components as described in detail with respect to the implementation shown in FIG. 1A. Expanding further, the system 100 includes the vehicle 102 and the mobile platform 110, for example, with the mobile platform 110 being integrated with the vehicle 102, or optionally, coupled to the mobile platform 110 via the vehicle interface 160. As shown in FIG. 1B, the mobile platform 110 includes the storage module 120 housing, containing, or including a number of the hydrogen tanks 122 that store hydrogen. The mobile platform 110 also includes the compression module 133 having the compressor 134 and the chiller 136 and being configured to provide pressurized and cooled hydrogen to the hydrogen powerplant 106 via the refueling infrastructure 105, as previously described herein.

Different from the implementation of FIG. 1A, the power module 150 (e.g., hydrogen power plant) may be included in the vehicle 102 and may be configured to provide electrical power to vehicle systems 103 (e.g., electronics, motors, displays, gages, sensors, etc.) of the vehicle 102, as well as to the compression module 133. In some implementations, a power module 150 may additionally, or alternatively, be included in and/or coupled to the mobile platform 110 and configured to provide electrical power to the compression module 133 and/or the vehicle systems 103. For example, the power module 150 included in the vehicle 102 may serve as a primary power module to provide electrical power to the vehicle systems 103 and the compression module 133, and the power module 150 included in the mobile platform 110 may serve as a secondary power module (e.g., a backup or reserve source of power) to provide backup power to the vehicle systems 103 and/or the compression module 133 (e.g., when the power module 150 is running low on power and/or hydrogen).

Figure 1C:
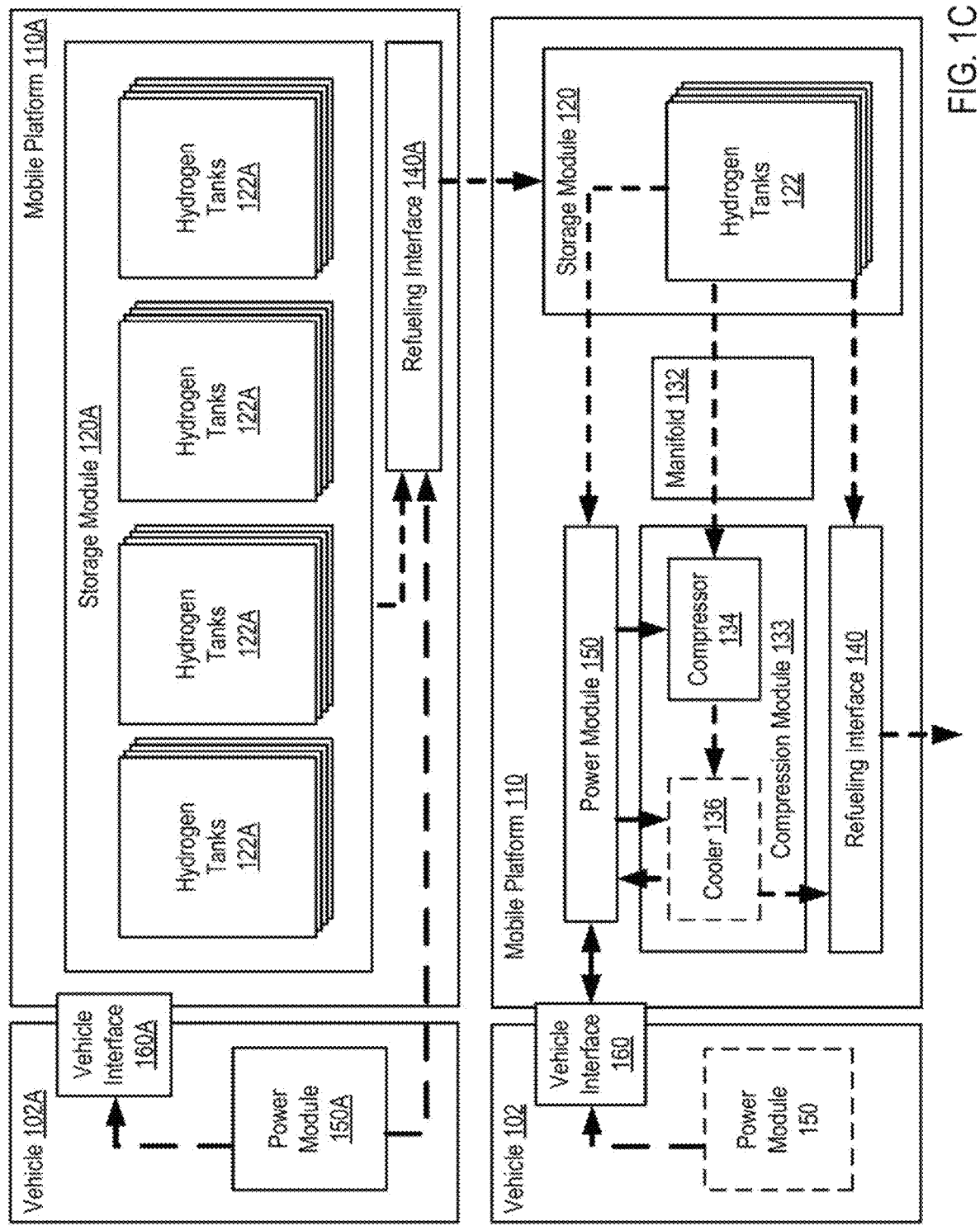
FIG. 1C is a schematic illustration of the mobile hydrogen refueling system of FIG. 1A and a second mobile hydrogen refueling system configured to refuel the mobile hydrogen refueling system.

FIG. 1C is a schematic illustration of the mobile hydrogen refueling system 100 of FIG. 1A showing the mobile hydrogen refueling platform 110 (e.g., a first platform) and a second mobile hydrogen refueling platform 110A (e.g., a second platform), which can be configured to refuel the first platform 110. The second mobile hydrogen platform 110A is coupled to a vehicle 102A via a vehicle interface 160A. A power module 150A, for example, a hydrogen power plant, may be included in the vehicle 102A and configured to provide electrical power to vehicle systems (not shown) of the vehicle 102A, the vehicle interface 160A (e.g., for uncoupling or coupling the vehicle interface 160A to the second mobile platform 110A), and optionally, to a refueling interface 140A included in the second mobile platform 110A. The vehicle 102A, the power module 150A, and the vehicle interface 160A may be substantially similar to the vehicle 102, the power module 150, and the vehicle interface 160, respectively, as previously described.

The second mobile platform 110A is configured to provide substantially larger hydrogen storage capacity than the first mobile platform 110 and as such, may be configured to provide hydrogen to the mobile platform(s) 110 on-site (e.g., on the mining or other work site). Thus, whenever the mobile platform(s) 110 are low on stored hydrogen, instead of the mobile platform(s) 110 returning to a hydrogen production site or storage location, the second mobile platform 110A may deliver hydrogen to the mobile platform(s) 110. In this manner, continuous hydrogen delivery may be possible and significant time and fuel may be saved as only the second mobile platform 110A may have to make trips to the hydrogen production site or storage location.

As shown in FIG. 1C, the second mobile platform 110A can include any number of storage modules 120A. The storage module 120A can be any suitable shape, size, and/or configuration. For example, in some embodiments, the storage module 120A can be a single integrated frame structure or the like configured to store any number of the hydrogen tanks 122A. In other embodiments, the storage module 120A can include and/or can be formed of a number of frame structures. Said another way, the second mobile platform 110A can be coupled to and/or can include a single storage module 120A configured to store a number of the hydrogen tanks 122A or can be coupled to and/or can include multiple storage modules 120A, each of which store a number of hydrogen tanks 122A. In embodiments with multiple storage modules 120A, the frames, structures, etc. of each module 120 can be similar or can be varied. In some embodiments, the storage modules 120A can include an open frame structure or the like designed to contain and/or immobilize the hydrogen tanks 122A. In other embodiments, the storage modules 120A can include a closed structure similar to and/or substantially the same as, for example, an intermodal container and/or the like. In such embodiments, the storage modules 120A can enclose the hydrogen tanks 122A to, for example, protect the hydrogen tanks 122A from conditions outside of the intermodal container (e.g., weather, sunlight, potential debris, etc.).

The storage module 120A can be configured to store and/or contain any number of hydrogen tanks 122A. However, different from the first mobile platform 110, the storage module 120A of the second mobile platform 110A spans a substantial area of the second mobile platform 110A and includes a substantially larger number of hydrogen tank 122A than the number of hydrogen tanks 122 included in the storage module 120 of the first mobile platform 110. For example, the storage module 120A may include 2×, 3×, 4×, 5×, 6×, 7×, 8×, 9×, 10×, or higher multiple of hydrogen tanks 122A relative to the hydrogen tanks 122 included in the storage module 120 of the first mobile platform 110. In this manner, the storage module 120A may provide 2×, 3×, 4×, 5×, 6×, 7×, 8×, 9×, 10×, or higher hydrogen storage capacity relative to the storage module 120.

The hydrogen tanks 122A can be any suitable shape, size, and/or configuration. In some embodiments, the hydrogen tanks 122A can be large pressure vessels configured to contain a compressed gas or a liquid (i.e., hydrogen). In some embodiments, the hydrogen tanks 122A can be similar to known tanks configured to store compressed hydrogen for typical or conventional use cases. In other embodiments, the hydrogen tanks 122A can be specialized tanks having a greater size and/or configured to store a greater volume of hydrogen or to store a volume of hydrogen at a greater pressure than known tanks. In some embodiments, the hydrogen tanks 122A may be substantially similar to the hydrogen tanks 122 included in the first mobile platform 110. In some embodiments, at least a portion of the hydrogen tanks 122A included in the mobile platform 110A may have a larger storage volume than each of the hydrogen tank 122 included in the mobile platform 110. For example, the amount of hydrogen storage by the hydrogen tanks 122A may be much greater than an amount of hydrogen stored by some known high-capacity hydrogen tank (or "tube") trailers, for example, at least about 2,000 kg of hydrogen. In some implementations, the storage module 120A of the mobile platform 110A can contain at least about 10,000 kg of hydrogen (e.g., 12,000 kg, 14,000 kg, 16,000 kg, 18,000 kg, 20,000 kg, 25,000 kg, inclusive, or more).

In some implementations, such a storage capacity can be based at least in part on, for example, a number of hydrogen tanks 122A stored, a size or storage capacity of the hydrogen tank(s) 122A, and/or a combination thereof. In some implementations, the storage module 120A may include a single module (e.g., a single high-capacity tube trailer) that contains, houses, or stores each of the hydrogen tanks 122A. In some implementations, the storage module 120A may include multiple submodules that are coupled, linked, or stacked together. For example, the submodules may include high-capacity tube trailers (e.g., 20 ft trailers or 40 ft trailers, or the like). In some implementations, any combination of smaller or larger storage submodules may be included in the storage module 120A. In certain implementations, the submodules may include 20 ft or 40 ft trailers that may include smaller subassemblies (e.g., racks, shelves, housings, etc.), each of which store a set of the hydrogen tanks 122A.

As described above, in some embodiments, the storage module 120A can be and/or can have a modular configuration allowing the storage module 120A to removably couple to the second mobile platform 110A. In some instances, such an arrangement can allow the storage module 120A to be replaced, for example, when the hydrogen tanks 122A are running low or drop below a threshold quantity, pressure, etc. In some implementations, the second mobile platform 110A can provide an indication of the amount, pressure, and/or fill level of the hydrogen tanks 122A in the storage module 120A. In some implementations, the replacement of the storage module 120A (e.g., replacing an empty or nearly empty module with a full module) can be performed in an autonomous or at least semi-autonomous process.

The second mobile platform 110A also includes the refueling interface 140A that is configured to selectively communicate the hydrogen stored in the storage module 120A to the storage module 120. In some embodiments, a pressure of the hydrogen stored in the storage tanks 122A of the storage module 120A may be higher than a pressure of the hydrogen tanks 122 of the storage module 120 such that when the refueling interface 140A is coupled to the storage module 120 and the refueling interface 140A is activated (e.g., a valve included in the refueling interface 140A is opened), the higher pressure of the hydrogen tanks 122A results in the hydrogen being communicated from the hydrogen tanks 122A to the hydrogen tanks 122 via the refueling interface 140A along the pressure gradient. In some embodiments, the refueling interface 140A may include pumps, compressors, or electrically activated sensors, actuators, etc. that may be powered by electrical power provided, for example, by the power module 150A.

Figure 3:
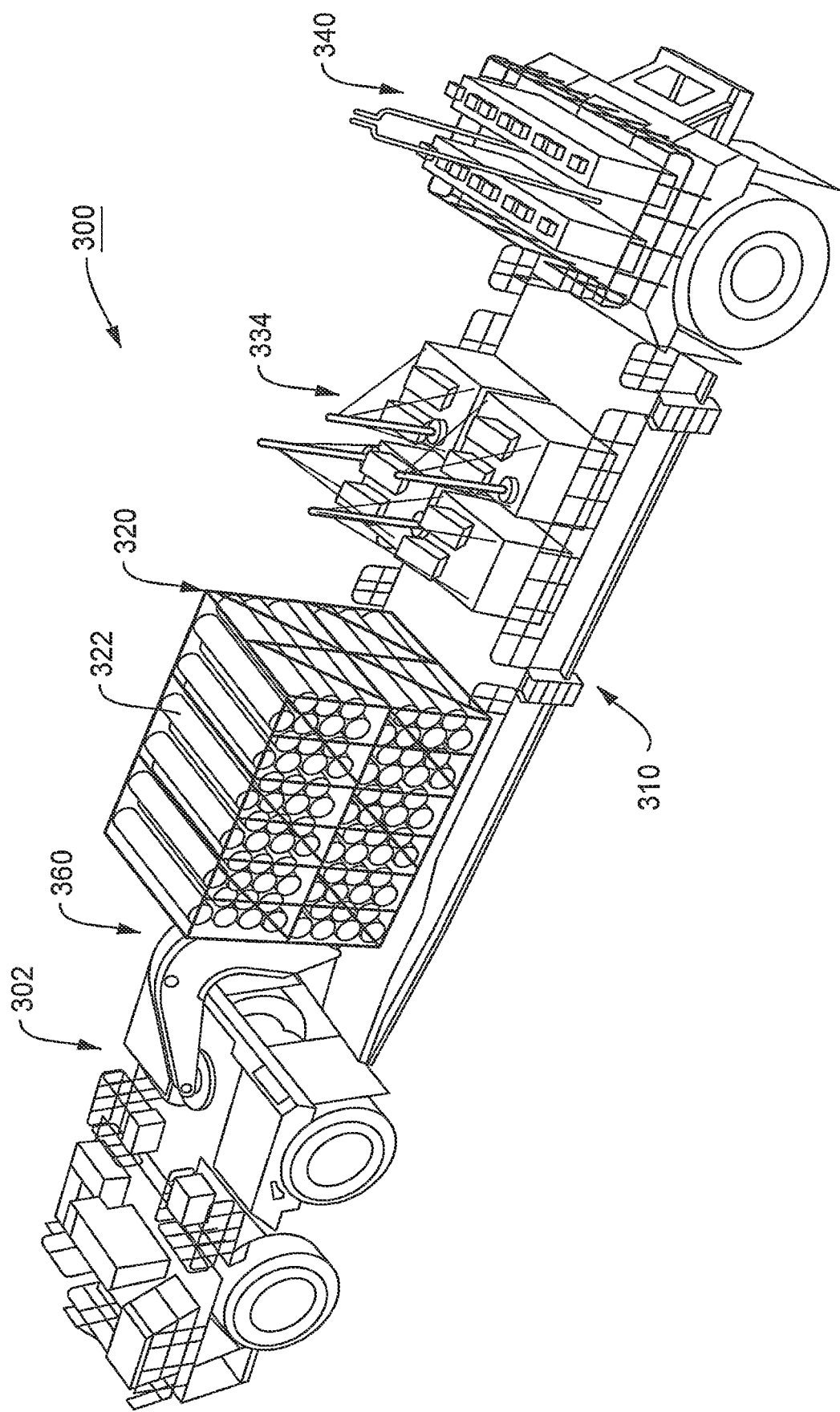
FIG. 3 is a perspective view illustration of a mobile hydrogen refueling system according to an embodiment.

FIG. 3 is a perspective view illustration of a mobile hydrogen refueling system 300, according to an embodiment. The mobile hydrogen refueling system 300 ("system") can be any suitable system configured to store and distribute a quantity of hydrogen fuel that meets a demand of large-scale industries such as, for example, the mining industry, the rail industry, the shipping/cargo industry, the aerospace industry, the large-scale fabrication industry, and/or the like. In addition, the system 300 is mobile allowing it to be moved between sites (e.g., mining sites) and/or work areas at a given site (e.g., different work areas at a mining site). In some embodiments, the system 300 can be designed for operation in rough, uneven, unpaved, and/or steep environments such as those encountered at mining sites or other heavy industrial work sites (e.g., the system 100 can be "ruggedized"). In some embodiments, the system 300 can be a modular and/or can include components that are modular, allowing components to be loaded, unloaded, serviced, replaced, etc. as needed or desired. In some implementations, the system 100 and/or one or more components thereof can be configured for autonomous or at least semi-autonomous operation.

As shown in FIG. 3 and as described in further detail herein, the system 300 is configured to store, transport, and/or distribute a flow of hydrogen gas to one or more refueling infrastructures and/or one or more hydrogen powerplants, for example, the refueling infrastructure 105 and the hydrogen powerplant 106, as described herein detail with respect to FIG. 1A. Accordingly, the system 300 is configured to store, transport, and/or distribute large quantities of hydrogen gas/fuel suitable for large-scale applications, as previously described herein.

As shown, the system 300 includes a mobile platform 310 that is coupleable to a heavy equipment vehicle 302 via a vehicle interface 360. The vehicle 302 and the vehicle interface 360 may be substantially similar to the vehicle 102 or 202, and the vehicle interface 160, as previously described herein. The mobile platform 310 includes, supports, and/or is coupled to at least one storage module 320, a refueling interface 340, and one or more compressors 334. The storage module 320 can be configured to store any number of hydrogen tanks 322 (e.g., tanks, tubes, canisters, etc.). The storage module 320 is configured to provide pressurized hydrogen to the refueling interface 340 for distribution via the refueling interface 340. In some implementations, the refueling interface 340 can be configured to engage a refueling infrastructure (e.g., the refueling infrastructure 105) found, for example, at an operation site such as a mining site. In addition or as an alternative, the refueling interface 340 can be configured to engage a refueling interface corresponding to a hydrogen powerplant such as, for example, hydrogen fuel cells of a hydrogen powerplant included in a mining truck or other equipment (e.g., the hydrogen powerplant 106).

The mobile platform 310 can have a size that exceeds one or more constraints associated with roadway travel. For example, a length, a width, a weight, and/or power of the mobile platform may exceed a constraint or threshold associated with roadway travel. As such, the mobile platform 310 is suitable for large-scale applications (e.g., a mining or excavation operation), where such size constraints are not encountered. As shown in FIG. 3, the mobile platform 310 can be a trailer coupled to the vehicle 302 via the vehicle interface 360. The mobile platform 310 includes a set of wheels that are coupled to a platform, bed, etc., which in turn, supports the modules, components, and/or the like coupled thereto. The bed of the mobile platform 310 may be substantially flat to allow stable positioning of the various modules of the mobile platform 310 thereon.

In some implementations, the modular arrangement of the mobile platform 310 can allow any of the modules and/or components to be loaded, unloaded, serviced, replaced, etc., as needed, or desired. In some implementations, the modular arrangement of the mobile platform 310 can allow for "hot swapping" of any of the modules and/or components (e.g., an exchange of modules without necessarily interrupting the operation of other modules). The mobile platform 310 does not include an enclosure such that each of the storage module 320, compressors 334, and refueling interface 340 are openly visible. As such, the mobile platform 310 may be configured to be deployed in a suitable geographical environment, where environmental damage or corrosion of the exterior surfaces or components included in the components, modules, and/or interfaces may not be a concern (e.g., temperate environments). In some implementations, the various components, modules, interfaces, etc. may be formed from or coated with weather resistant materials (e.g., weather resistant paint) such that the mobile platform 310 may be used in any geographical environment (e.g., a temperate environment, a hot or cold environment, a desert environment, a dry environment, or a wet environment) even without an enclosure.

The mobile platform 310 includes the storage module 320 that stores, contains, or holds a set of hydrogen tanks 322. The hydrogen tanks 322 may be substantially similar to the hydrogen tanks 122 described in detail with respect to FIG. 1A. As shown in FIG. 3, the storage module 320 may include a single integrated frame structure or the like configured to store the set of hydrogen tanks 322 in a horizontal and vertical array. In other embodiments, the storage module 320 can include and/or can be formed of a number of frame structures. Said another way, the mobile platform 310 can be coupled to and/or can include a single storage module 320 configured to store a number of the hydrogen tanks 322 or can be coupled to and/or can include multiple storage modules 320, each of which store a number of hydrogen tanks 322. While FIG. 3 shows the storage module 320 as including an open frame structure, in other embodiments, the storage module 320 may include a closed structure similar to and/or substantially the same as, for example, an intermodal container and/or the like. In such embodiments, the storage module 320 can enclose the hydrogen tanks 322 to, for example, protect the hydrogen tanks 322 from conditions outside of the intermodal container (e.g., weather, sunlight, potential debris, etc.).

Although not shown in FIG. 3, the mobile platform 310 may include a manifold (e.g., the manifold 132) to communicate hydrogen stored in the storage module 320 to the one or more compressors 334 and/or the refueling interface 340. For example, the manifold may be routed from the storage module 320 to the compressor(s) 334 and/or to the refueling interface 340 from an underside of the mobile platform 310, e.g., run along or proximate to a surface of the mobile platform 310 that faces the ground. In other implementations, the manifold may be disposed on an upper side of the mobile platform 310, e.g., a side that faces away from the ground. The manifold may include an inlet or inlet interface that can be in fluid communication with the storage module 320 (or at least one hydrogen tank 322 included therein), an outlet or outlet interface that can be in fluid communication with one or more components of the mobile platform 310, and one or more fluid flow paths between the inlet and outlet. In some implementations, the storage module 320 and/or the manifold may include one or more components to control or manage the flow of hydrogen between the storage module 320 and any suitable component of the mobile platform 310. In some implementations, the manifold may include a mechanical nozzle interface for receiving hydrogen from the storage module 320 and/or communicating the hydrogen to any suitable module of the mobile platform 310. In some implementations, the storage module 320 and/or the manifold may include one or more safety valves, pressure sensors, and any other safety devices that are configured to be selectively activated or deactivated to, for example, in response to detecting a pressure above a threshold pressure, or an activation signal received from a controller so as to inhibit damage or prevent failure.

The compressors 334 can be any suitable shape, size, and/or configuration, and/or can include any suitable component(s), subcomponent(s), etc. As described above with reference to the mobile platform 110 shown in FIG. 1A, in some embodiments, the compressors 334 can be included in a compression module (e.g., the compression module 133) or similar module or assembly. In some embodiments, the compressor(s) 334 can be similar to and/or substantially the same as some know compressors configured to compress a gas. For example, in some embodiments, the compressor 334 may be and/or may include a diaphragm compressor, a rotary compressor, and/or the like configured to compress and pressurize hydrogen received from the hydrogen tanks 322 (e.g., via a manifold or the like). In some embodiments, the compressor(s) 334 can be, for example, a high-pressure compressor configured to receive an input flow of a pressurized gas and to provide an output flow of compressed/high-pressure gas at a higher pressure than the input flow of gas. In some implementations, for example, the compressor(s) 334 can receive a flow of hydrogen gas having a pressure between about 200 bar and 400 bar and can output a flow of high-pressure hydrogen gas (or liquid hydrogen) having a pressure between about 400 bar and 1,000 bar. In some instances, the compressors 334 can be configured to provide an output flow of high-pressure hydrogen gas (or liquid hydrogen) one or more components, modules, interfaces, etc. of the mobile platform 310 such as, for example, the refueling interface 340. In some instances, a high-pressure flow of hydrogen may be desirable as it can be used to produce a flow of hydrogen having a relatively high volumetric flow rate (e.g., about 4 kg/min or compressed hydrogen gas), which in turn, can reduce refueling times and increase utilization of the equipment having the hydrogen powerplant (e.g., the hydrogen powerplant 106 described above). As such, the compressor(s) 334 can be substantially similar to the compressors 134 described in detail above with reference to FIG. 1A.

In some implementations, the refueling interface 340 can include any suitable component configured to allow a flow of hydrogen gas having a high flow rate suitable for transferring relatively large volumes of hydrogen gas to storage tanks or the like associated with at least one of a refueling infrastructure and/or the hydrogen powerplant (e.g., associated with a mining vehicle). In some implementations, the refueling interface 340 can be configured to provide a flow of hydrogen gas to the power module. In some embodiments, the storage module 320 may be configured to store hydrogen gas at a pressure in a range of 200 bar to 1,000 bar, inclusive so as to provide high pressured hydrogen gas to the refueling interface 340 for providing to the refueling infrastructure and/or the hydrogen powerplant, as previously described. In some implementations the refueling interface may be configured to provide a flow of hydrogen at a flow rate of at least about 4 kg/min (e.g., about 4 kg/min, 5 kg/min, 6 kg/min, 7 kg/min, 8 kg/min, 9 kg/min, 10 kg/min, 15 kg/min, 20 kg/min, 25 kg/min, 30 kg/min, or more), so as to allow rapid filling and/or refueling of the hydrogen powerplant of, for example, a mining haul truck or other hydrogen-powered equipment. Although not shown in FIG. 3, the refueling interface 340 can include any suitable hosing, tubes, conduits, pipes, etc. configured to covey the compressed hydrogen to an outlet of the refueling interface 340.

The system 300 also includes one or more power modules (not shown in FIG. 3). In some embodiments, the power module(s) is/are included in the mobile platform 310 and has/have a modular configuration and/or the like allowing one or more power modules to be handled or operated relative to the mobile platform 310 independently. Thus, if one power module requires maintenance, service, and/or replacement, such an arrangement can allow that power module to be replaced substantially without impacting the operation of other power modules or other modules of the mobile platform 310. In other embodiments, the power module can be included in and/or otherwise can be the power module of the vehicle 302. For example, in the embodiment shown in FIG. 3, the power module can be a hydrogen power plant of the vehicle 302. As such, the power module can be configured to supply power to each of the vehicle 302 and the mobile platform 310 (or components thereof) via the vehicle interface 360.

With the power module being the hydrogen power plant of the vehicle 302, the power module can be configured to receive a flow or supply of hydrogen from the mobile platform 310 (e.g., directly from the storage module 320 (or via a manifold or interface therebetween) or via the refueling interface 340. In some implementations, the power module can include one or more hydrogen tanks similar to and/or substantially the same as one or more of the hydrogen tanks 322 included in the storage module 320. As such, the hydrogen tank(s) can receive a flow of hydrogen from the storage module 320, the refueling interface 340, and/or the like and, in turn, can supply the power module with the hydrogen. In some implementations, the power module can receive a flow of hydrogen directly from one or more hydrogen tanks 322 in the storage module (or via a manifold or interface therebetween).

The power module is configured to provide electric power to at least the vehicle 302 and the mobile platform 310 (e.g., the compressors 334 and/or the refueling interface 340) via the vehicle interface 360. In some implementations, the power module can also provide electric power to the storage module 320 and/or any other component, module, system, and/or the like. For example, in some implementations, a mobile platform 310 can be operated at a refueling location or the like at an industrial work site such as a mining site or the like. In some such implementations, the power module can provide a flow of electric power operable to power one or more components of the refueling location (e.g., a lighting system, a refueling infrastructure, and/or any other components).

In some implementations, the power module can be configured to output a flow of electric power operable to electrically power one or more electric and/or electronic components of the vehicle interface 360.

While the power module is described above it should be understood that the description is provided by way of example only. In some embodiments, the system 300 can include any other or additional power module, generator, storage device, and/or the like. For example, in some implementations, the mobile platform 310 can include, for example, an energy storage device such as one or more batteries, capacitors, flywheels, etc. that can receive electric power from the power module of the vehicle 302. In such implementations, the energy storage device can, in turn, provide electric power to the storage module 320, the compressors 334, the refueling interface 340, and/or any other suitable component and/or module.

Figure 4:
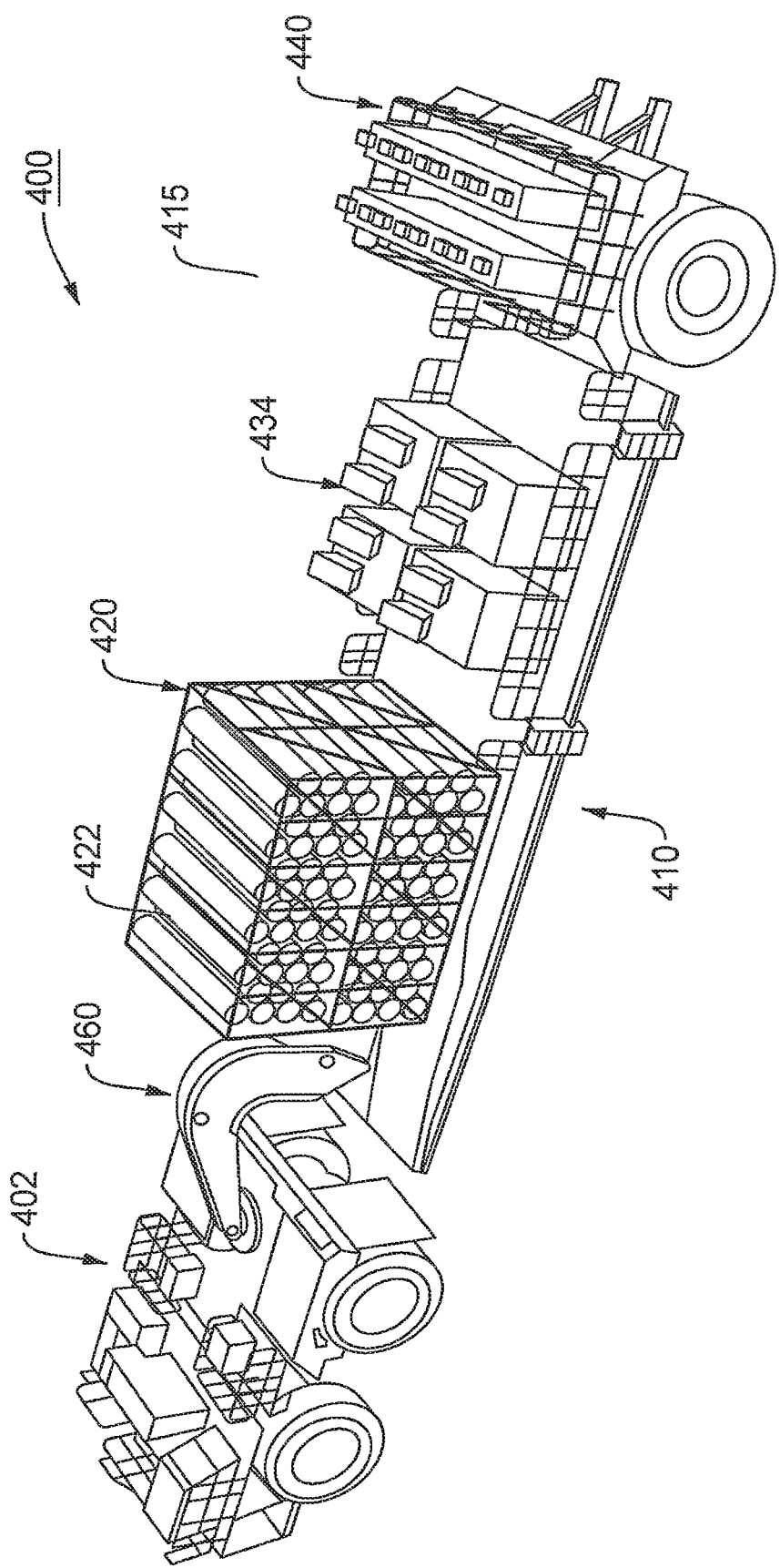
FIG. 4 is a perspective view illustration of a mobile hydrogen refueling system according to an embodiment.

FIG. 4 is a perspective view illustration of a mobile hydrogen refueling system 400, according to an embodiment. The mobile hydrogen refueling system 400 ("system") can be any suitable system configured to store and distribute a quantity of hydrogen fuel that meets a demand of large-scale industries such as, for example, the mining industry, the rail industry, the shipping/cargo industry, the aerospace industry, the large-scale fabrication industry, and/or the like. In addition, the system 400 is mobile allowing it to be moved between sites (e.g., mining sites) and/or work areas at a given site (e.g., different work areas at a mining site). In some embodiments, the system 400 can be designed for operation in rough, uneven, unpaved, and/or steep environments such as those encountered at mining sites or other heavy industrial work sites (e.g., the system 400 can be "ruggedized"). In some embodiments, the system 400 can be modular and/or can include components that are modular, allowing components to be loaded, unloaded, serviced, replaced, etc. as needed or desired. In some implementations, the system 400 and/or one or more components thereof can be configured for autonomous or at least semi-autonomous operation.

As shown in FIG. 4 and as described in further detail herein, the system 400 is configured to store, transport, and/or distribute a flow of hydrogen gas to one or more refueling infrastructures and/or one or more hydrogen powerplants, for example, the refueling infrastructure 105 and the hydrogen powerplant 106, as described herein detail with respect to FIG. 1A. Accordingly, the system 400 is configured to store, transport, and/or distribute large quantities of hydrogen gas/fuel suitable for large-scale applications, as previously described herein.

As shown, the system 400 is substantially similar to the system 300 and includes a mobile platform 410 that is coupleable to a heavy equipment vehicle 402 via a vehicle interface 460. The vehicle 402 and the vehicle interface 460 may be substantially similar to the vehicle 102, 202, 302 and the vehicle interface 160, 360, respectively, as previously described herein. The mobile platform 410 includes, supports, and/or is coupled to at least one storage module 420 including a number of hydrogen tanks 422, one or more compressors 434, and a refueling interface 440. The storage module 420, compressors 434, and the refueling interface 440 may be substantially similar to the storage module 320, the compressors 434, and the refueling interface 340, respectively, described with respect to the system 300, and therefore not described in further detail herein. Moreover, although not shown in FIG. 4, the vehicle 402 can include a power module similar to or substantially the same as the power module described above with reference to the system 300.

Different from the system 300, the mobile platform 410 includes an enclosure 415. The enclosure 415 can be any suitable structure configured to enclose, house, cover, etc., one or more component and/or module of the mobile platform 410. For example, as shown in FIG. 4, the compressors 434 and the refueling interface 440 can be at least partially disposed in the enclosure 415, while the storage module 420 is disposed substantially outside the enclosure 415. In some implementations, at least a portion of the refueling interface 440 may be accessible through the enclosure 415 to allow the refueling interface 440 to be interfaced with a refueling infrastructure and/or a hydrogen powerplant, as previously described. In some implementations, the enclosure 415 may be include one or more openings (e.g., a door, windows, apertures, etc.) through which fluidic couplings, fluid or gas transport lines, tubes, nozzles, etc. may be accessible to allow interfacing with the refueling infrastructure and/or the hydrogen powerplant.

As such, the enclosure 415 can, for example, enclose and/or protect one or more modules and/or components of the mobile platform 410 from an environment external to the enclosure 415. In some embodiments, the enclosure 415 can be insulated or at least partially insulated, which in turn, can insulate the compressors 434 and the refueling interface 440 disposed therewithin, thus allowing the mobile platform 410 to be operated in any geographical environment (e.g., a temperate environment, a hot or cold environment, a desert environment, a tundra environment, a dry environment, or a wet environment).

FIG. 5 is a side view illustration of a mobile hydrogen refueling system 500, according to an embodiment. The mobile hydrogen refueling system 500 ("system") can be any suitable system configured to store and distribute a quantity of hydrogen fuel that meets a demand of large-scale industries such as, for example, the mining industry, the rail industry, the shipping/cargo industry, the aerospace industry, the large-scale fabrication industry, and/or the like. In addition, the system 500 is mobile allowing it to be moved between sites (e.g., mining sites) and/or work areas at a given site (e.g., different work areas at a mining site). In some embodiments, the system 500 can be designed for operation in rough, uneven, unpaved, and/or steep environments such as those encountered at mining sites or other heavy industrial work sites (e.g., the system 500 can be "ruggedized"). In some embodiments, the system 500 can be a modular and/or can include components that are modular, allowing components to be loaded, unloaded, serviced, replaced, etc. as needed or desired. In some implementations, the system 500 and/or one or more components thereof can be configured for autonomous or at least semi-autonomous operation.

As shown in FIG. 5, the system 500 is configured to store, transport, and/or distribute a flow of hydrogen gas to one or more refueling infrastructures and/or one or more hydrogen powerplants, for example, the refueling infrastructure 105 and the hydrogen powerplant 106, as described herein in detail with respect to FIG. 1A. Accordingly, the system 500 is configured to store, transport, and/or distribute large quantities of hydrogen gas/fuel suitable for large-scale applications, as previously described herein.

As shown, the system 500 is substantially similar to the system 300 and 400 and includes a mobile platform 510 that is coupleable to a heavy equipment vehicle 502 via a vehicle interface 560. The vehicle 502 and the vehicle interface 560 may be substantially similar to the vehicle 102, 202, 302, 402 and the vehicle interface 160, 360, 460, respectively, as previously described herein. The mobile platform 510 includes, supports, and/or is coupled to at least one storage module 520 including a number of hydrogen tanks 522, one or more compressors 534, and a refueling interface 540. The storage module 520, compressors 534, and the refueling interface 540 may be substantially similar to the storage module 320, 420, the compressors 334, 434, and the refueling interfaces 340, 440, respectively, as described with respect to the system 300, 400 and therefore, not described in further detail herein. Moreover, although not shown in FIG. 5, the vehicle 502 can include a power module similar to or substantially the same as the power module described above with reference to the system 300.

The mobile platform 500 includes an enclosure 515. Similar to the enclosure 415, the enclosure 515 can be any suitable structure configured to enclose, house, cover, etc. one or more component, module, and/or interface of the mobile platform 510. However, different from the mobile platform 410, each of the storage module 520, the compressors 434, and the refueling interface 540 are disposed within the enclosure 515. As such, the enclosure 515 can, for example, enclose and/or protect each of the storage module 520, the compressors 534, and the refueling interface 540 from an environment external to the enclosure 515. In some embodiments, the enclosure 515 can be insulated or at least partially insulated, which in turn, can insulate the compressors 534 and the refueling interface 540 disposed therewithin, thus allowing the mobile platform 510 to be operated in any geographical environment (e.g., a temperate environment, a hot or cold environment, a desert environment, a tundra environment, a dry environment, or a wet environment).

For example, in some implementations, at least a portion of the refueling interface 540 may be accessible through the enclosure 515 to allow the refueling interface 540 to be interfaced with a refueling infrastructure and/or a hydrogen powerplant, as previously described. In some implementations, the enclosure 515 may include one or more openings (e.g., a door, windows, apertures, etc.) through which fluidic couplings, fluid or gas transport lines, tubes, nozzles, etc. may be accessible to allow interfacing with the refueling infrastructure and/or the hydrogen powerplant.

Figure 6A:
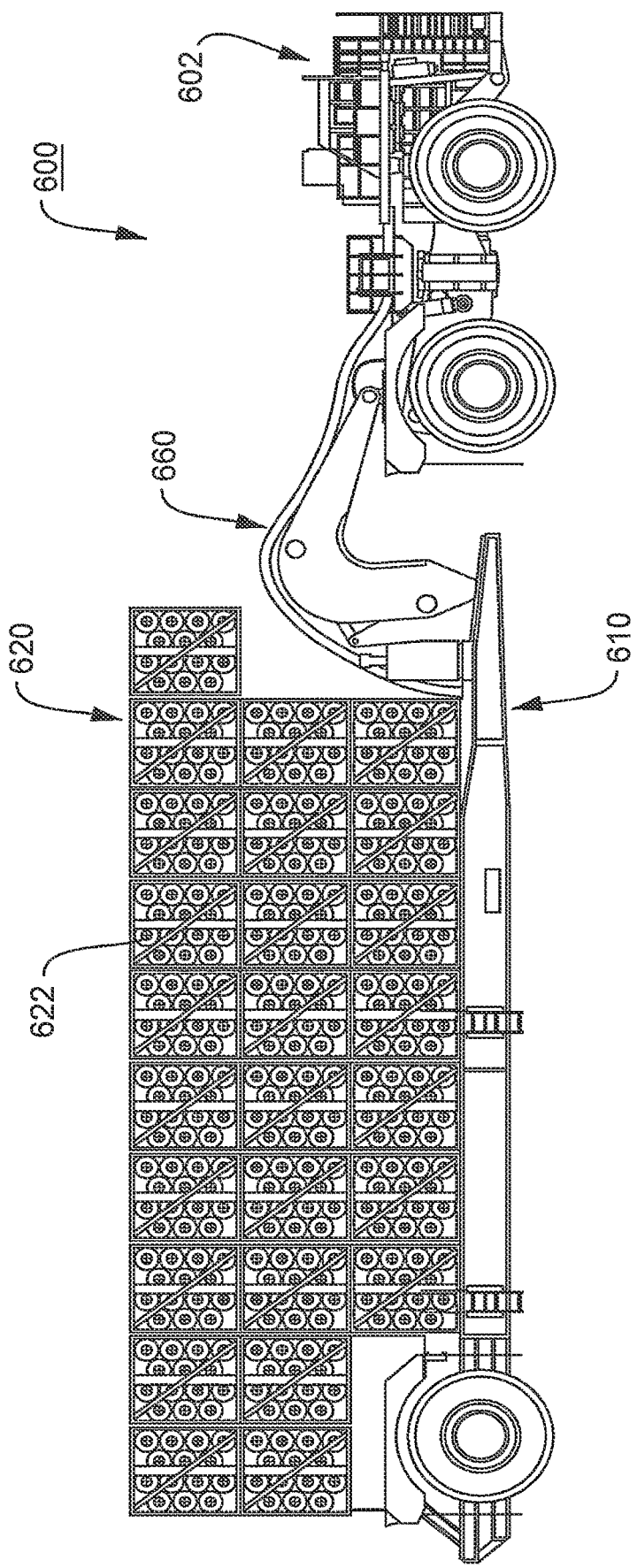
FIG. 6A is a side view illustration of a mobile hydrogen refueling system according to an embodiment.

FIG. 6A is a side view illustration of a mobile hydrogen refueling system 600 ("system"), according to an embodiment. The system 600 is configured for maximum storage of hydrogen, for example, to provide onsite refueling to other mobile hydrogen fueling systems (e.g., the systems 100, 300, 400, 500) in the field. As shown in FIG. 6A, the system 600 includes a vehicle 602 coupled (e.g., removably coupled) to a mobile platform 610 via a vehicle interface 660. The vehicle 602 and the vehicle interface 660 may be substantially similar to the vehicle 102, 202, 302, 402, or 502, and the vehicle interface 160, 360, 460, 560, respectively, as previously described herein.

The mobile platform 610 includes a storage module 620 including a set of hydrogen tanks 622. However, different from the mobile platforms 300, 400, 500, the mobile platform 610 is configured primarily for hydrogen storage such that a substantial area of the mobile platform 610 is occupied by the storage module 620, as described above with reference to the second mobile platform 110A shown in FIG. 1C. The storage module 620 can include any number of storage modules 620. The storage module 620 can be any suitable shape, size, and/or configuration, for example, have a substantially rectangular shape. In some embodiments, the storage module 620 can include and/or can be formed of a number of frame structures, as shown in FIG. 6A. In other embodiments, the storage module 620 can be a single integrated frame structure or the like configured to store any number of the hydrogen tanks 622. Said another way, the mobile platform 610 can be coupled to and/or can include a single storage module 620 configured to store a number of the hydrogen tanks 622 or can be coupled to and/or can include multiple storage modules 620, each of which store a number of hydrogen tanks 622. In embodiments with multiple storage modules 620, the frames, structures, etc. of each module 620 can be similar or can be varied. In some embodiments, the storage modules 620 can include an open frame structure or the like designed to contain and/or immobilize the hydrogen tanks 622, as shown in FIG. 6A. In other embodiments, the storage modules 620 can include a closed structure similar to and/or substantially the same as, for example, an intermodal container and/or the like. In such embodiments, the storage modules 620 can enclose the hydrogen tanks 622 to, for example, protect the hydrogen tanks 622 from conditions outside of the intermodal container (e.g., weather, sunlight, potential debris, etc.). Such an embodiment is shown, for example, in FIG. 6B and described below.

As described herein, the storage module 620 of the mobile platform 610 spans a substantial area of the mobile platform 610 and includes a substantially larger number of hydrogen tanks 622 than the number of hydrogen tanks 522 included in the storage module 520 of the mobile platform 510. For example, the storage module 620 may include 2×, 3×, 4×, 5×, 6×, 7×, 8×, 9×, 10×, or higher multiple of hydrogen tanks 622 relative to the hydrogen tanks 322, 422, 522 included in the storage module 320, 420, 520 of the mobile platforms 310, 410, 510, respectively. In this manner, the storage module 620 may provide 2×, 3×, 4×, 5×, 6×, 7×, 8×, 9×, 10×, or more hydrogen storage capacity relative to the storage modules 320, 420, and/or 520. For example, the amount of hydrogen stored by the hydrogen tanks 622 may be much greater than an amount of hydrogen stored by some known high-capacity hydrogen tank (or "tube") trailers, for example, at least about 2,000 kg of hydrogen. In some implementations, the storage module 620 of the mobile platform 610 can contain at least about 10,000 kg of hydrogen (e.g., 12,000 kg, 14,000 kg, 16,000 kg, 18,000 kg, 20,000 kg, 25,000 kg, inclusive, or more), as described above with reference to the storage module 120A.

In some implementations, such a storage capacity can be based at least in part on, for example, a number of hydrogen tanks 622 stored in the storage module 620, a size or storage capacity of the hydrogen tank(s) 622, and/or a combination thereof. In some implementations, the storage module 620 may include a single module (e.g., a single high-capacity tube trailer) that contains, houses, or stores each of the hydrogen tanks 622. In some implementations, the storage module 620 may include multiple submodules that are coupled, linked, or stacked together. For example, the submodules may include high-capacity tube trailers (e.g., 20 ft trailers or 40 ft trailers, or the like). In some implementations, any combination of smaller or larger storage submodules may be included in the storage module 620.

As described above, in some embodiments, the storage module 620 can be and/or can have a modular configuration allowing the storage module 620 to removably couple to the mobile platform 610. In some instances, such an arrangement can allow the storage module 620 to be replaced, for example, when the hydrogen tanks 622 are running low or drop below a threshold quantity, pressure, etc. In some implementations, the mobile platform 610 can provide an indication of the amount, pressure, and/or fill level of the hydrogen tanks 622 in the storage module 620. In some implementations, the replacement of the storage module 620 (e.g., replacing an empty or nearly empty module with a full module) can be performed in an autonomous or at least semi-autonomous process.

While not shown, the mobile platform 610 may also include a refueling interface (e.g., the refueling interface 140, 340, 440, 540) that is configured to selectively communicate the hydrogen stored in the storage module 620 to storage modules of other mobile hydrogen refueling systems (e.g., the systems 100, 300, 400, 500). In some embodiments, a pressure of the hydrogen stored in the hydrogen tanks 622 of the storage module 620 may be higher than a pressure of the hydrogen tanks of storage modules of systems to which the hydrogen is being delivered. In such implementations, when the refueling interface is coupled to a storage module of a system being refueled, and the refueling interface is activated, the higher pressure of the hydrogen tanks 622 may result in the hydrogen being communicated from the hydrogen tanks 622 to the hydrogen tanks of the system being refueled via the refueling interface along the pressure gradient. In some embodiments, the refueling interface may include pumps, compressors, or electrically activated sensors, actuators, etc. that may be powered by electrical power provided by a power module, for example, a power module included in the vehicle 602.

Figure 6B:
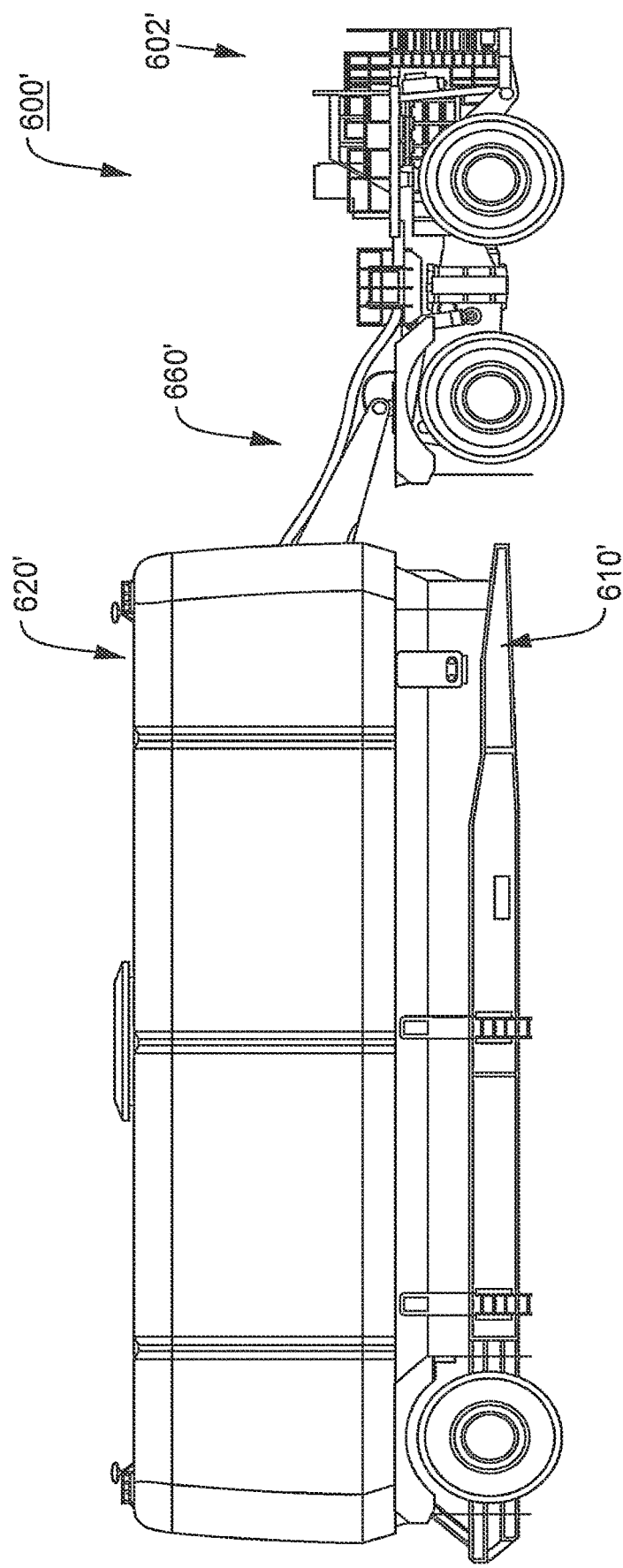
FIG. 6B is a side view illustration of a mobile hydrogen refueling system according to an embodiment.

FIG. 6B is a side view illustration of a mobile hydrogen refueling system 600' ("system"), according to an embodiment. The system 600' can be substantially similar to system 600 described above with reference to FIG. 6A. For example, the system 600' can include a vehicle 602' coupled (e.g., removably coupled) to a mobile platform 610' via a vehicle interface 660'. The vehicle 602' and the vehicle interface 660' may be substantially similar to the vehicle 602 and the vehicle interface 660, respectively, as described above with reference to FIG. 6A. The mobile platform 610' can include a storage module 620' configured to store any suitable number of hydrogen tanks (not shown). In this embodiment, the storage module(s) 620' enclose the hydrogen tanks to, for example, protect the hydrogen tanks from outside conditions (e.g., weather, sunlight, potential debris, etc.).

Figure 7:
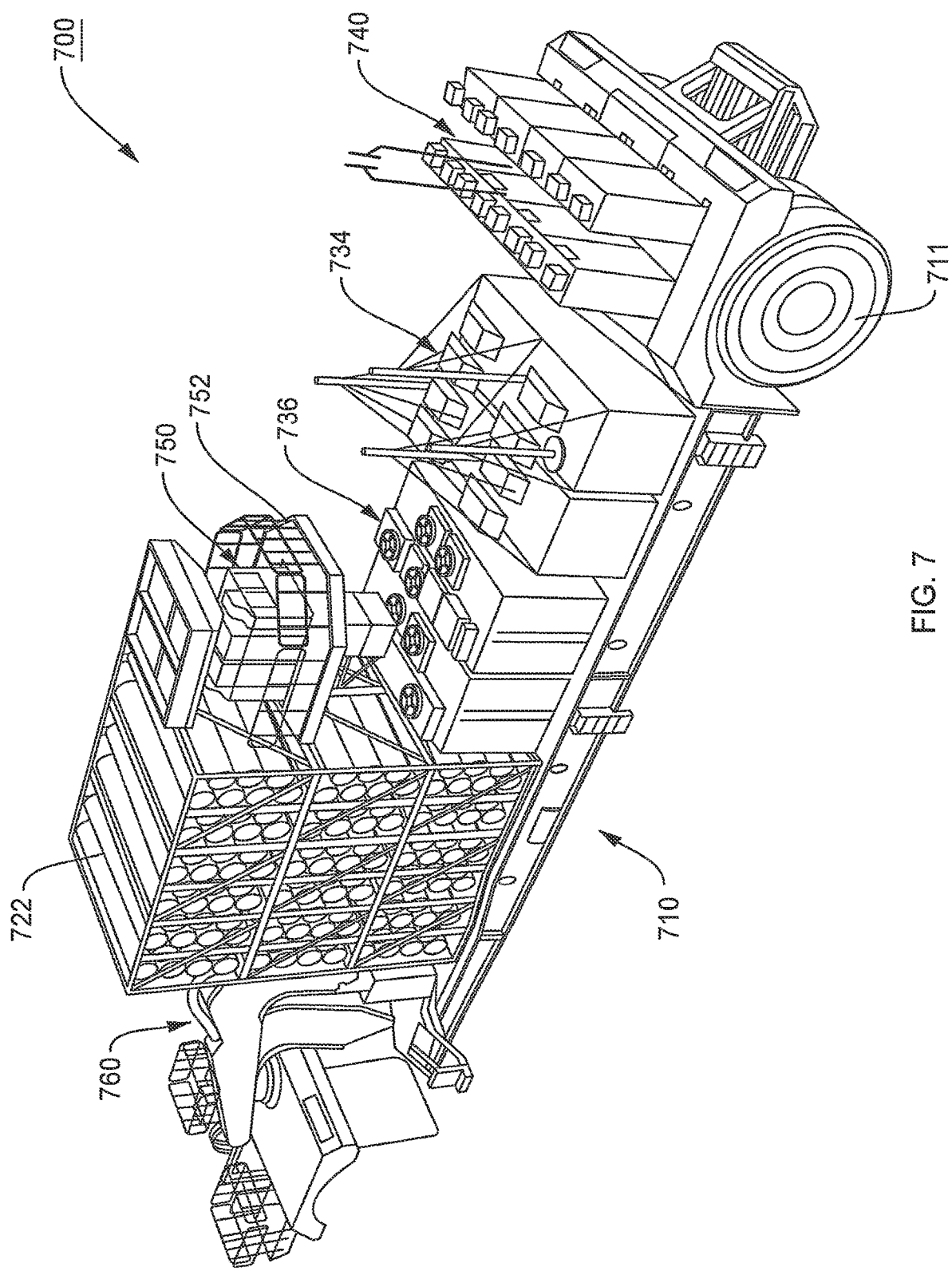
FIG. 7 is a perspective view illustration of a mobile hydrogen refueling system according to an embodiment.

FIG. 7 is a perspective view illustration of a mobile hydrogen refueling system 700, according to an embodiment. The mobile hydrogen refueling system 700 ("system") can be any suitable system configured to store and distribute a quantity of hydrogen fuel that meets a demand of large-scale industries such as, for example, the mining industry, the rail industry, the shipping/cargo industry, the aerospace industry, the large-scale fabrication industry, and/or the like. In addition, the system 700 is mobile allowing it to be moved between sites (e.g., mining sites) and/or work areas at a given site (e.g., different work areas at a mining site). In some embodiments, the system 700 can be designed for operation in rough, uneven, unpaved, and/or steep environments such as those encountered at mining sites or other heavy industrial work sites (e.g., the system 100 can be "ruggedized"). In some embodiments, the system 700 can be a modular and/or can include components that are modular, allowing components to be loaded, unloaded, serviced, replaced, etc. as needed or desired. In some implementations, the system 100 and/or one or more components thereof can be configured for autonomous or at least semi-autonomous operation.

The system 700 is configured to store, transport, and/or distribute a flow of hydrogen gas to one or more refueling infrastructures and/or one or more hydrogen powerplants, as previously described. As shown, the system 700 includes a mobile platform 710 that is coupleable to a heavy equipment vehicle (e.g., the vehicle 102, 202, 302, 402, 502, 602) via a vehicle interface 760. The vehicle interface 760 may be substantially similar to the vehicle interface 160, 360, 460, 560, 660, as previously described herein.

The mobile platform 710 includes, supports, and/or is coupled to a storage module 720, a set of compressors 734, a set of chillers 736, a refueling interface 740, and at least one power module 750. The storage module 720 can be configured to store any number of hydrogen tanks 722 (e.g., tanks, tubes, canisters, etc.). While not shown, the mobile platform 710 may also include one or more manifolds that couple the storage module 720 to the compressors 734 and/or the chillers 736. The one or more manifolds may allow the compressors 734 to interface with the storage module 720. The one or more manifolds may be substantially similar to the manifold 132 described with respect to the mobile platform 110, and not described in further detail herein.

The compressors 734 are configured to produce a flow of high-pressure hydrogen, which in turn, can be cooled by the chillers 736. As such, mobile platform 710 selectively can provide a flow of cooled, high-pressure hydrogen for distribution via the refueling interface 740. In some implementations, the refueling interface 740 can be configured to engage a refueling infrastructure (e.g., the refueling infrastructure 105) found, for example, at an operation site such as, for example, a mining site. In addition or as an alternative, the refueling interface 740 can be configured to engage a refueling interface corresponding to a hydrogen powerplant (e.g., the hydrogen powerplant 106) such as, for example, hydrogen fuel cells of a hydrogen powerplant included in a mining truck or other equipment.

As shown in FIG. 7, the mobile platform 710 has a shape, size, and/or configuration that exceeds one or more constraints associated with roadway travel. As such, the mobile platform 710 is suitable for large-scale applications, where such size constraints are not encountered. In some embodiments, the mobile platform 710 includes a trailer that can be coupled to a vehicle (e.g., the vehicle 102, 202, 302, 402, 502, or 602) via a vehicle interface 760. For example, as shown in FIG. 7, the mobile platform 710 includes a set of wheels 711 that are coupled to a platform, bed, etc., which in turn, supports the modules, components, and/or the like coupled thereto.

The vehicle interface 760 can be and/or can include, for example, a gooseneck hitch or connection (as shown in FIG. 7), and/or other heavy-duty connection. The vehicle interface 760 may be substantially similar to the vehicle interface 160, 360, 460, 560, 660, or any other vehicle interface described herein. As such, the vehicle interface 760 can include any suitable component and/or can have any suitable configuration that allows the mobile platform 710 to interface and/or couple to the vehicle 702. In some implementations, the vehicle interface 760 can be a physical interface as well as any other suitable interface such as an electrical and/or electronic interface. For example, such a vehicle interface 760 can provide an electric interface allowing electric power to be transferred between the vehicle and the mobile platform 710. In other implementations, the vehicle interface 760 can be a platform, bed, and/or structure that is mounted to the chassis or other portion of the vehicle 702 (e.g., the mobile platform 710 is integrated with the vehicle), as previously described herein.

Although not shown in FIG. 7, the mobile platform 710 can include one or more features and/or structures that allow a modular arrangement and/or coupling between the mobile platform 710 and the storage module 720, the compressors 734, the chillers 736, the power module 750, and/or any other suitable component. For example, the mobile platform 710 may include rails, tracks, couplers, connectors, interfaces, etc. that are designed to removably engage one or more of the components and/or modules. In some implementations, the modular arrangement of the mobile platform 710 can allow any of the modules and/or components to be loaded, unloaded, serviced, replaced, etc. as needed or desired. In some implementations, the modular arrangement of the mobile platform 710 can allow for "hot swapping" of any of the modules and/or components (e.g., an exchange of modules without necessarily interrupting the operation of other modules).

The mobile platform 710 may have a modular arrangement allowing the mobile platform 710 to be configured with specific components and/or modules based at least in part on the conditions at a deployment/work site. For example, the mobile platform 710 may be configured to be deployed in a hot, desert environment may include components and/or modules such as extra chillers or the like that may not be desirable for a mobile platform 710 configured for deployment in a cold, artic or tundra environment. While not shown, in some embodiments, the mobile platform 710 can further include an enclosure (e.g., similar to the enclosures 115, 415, and/or 515), that can cover or enclose at least some of the modules included in the mobile platform 710, as previously described.

The mobile platform 710 can include any number of storage modules 720. While FIG. 7 shows the storage module 720 as being rectangular in shape and including a single integrated frame structure configured to store a number of hydrogen tanks, in other embodiments, the storage module 720 can be any suitable shape, size, and/or configuration. In other embodiments, the storage module 720 can include and/or can be formed of a number of frame structures. Said another way, the mobile platform 710 can be coupled to and/or can include a single storage module 720 configured to store a number of the hydrogen tanks 722 or can be coupled to and/or can include multiple storage modules 720, each of which store a number of hydrogen tanks 722. In embodiments with multiple storage modules 720, the frames, structures, etc. of each module 720 can be similar or can be varied. While shown as including an open frame structure, in other embodiments, the storage module 720 can include a closed structure similar to and/or substantially the same as, for example, an intermodal container and/or the like. In such embodiments, the storage modules 720 can enclose the hydrogen tanks 722 to, for example, protect the hydrogen tanks 722 from conditions outside of the intermodal container (e.g., weather, sunlight, potential debris, etc.).

The storage module 720 can be configured to store and/or contain any number of hydrogen tanks 722. The hydrogen tanks 722 can be any suitable shape, size, and/or configuration. The hydrogen tanks 722 may be substantially similar to the hydrogen tanks 122, 322, 422, 522, or 622, and therefore, not described in further detail herein. The storage capacity of the storage module 720 can be based at least in part on, for example, a number of hydrogen tanks 722 stored, a size or storage capacity of the hydrogen tanks 722, and/or a combination thereof. In some implementations, the storage module 720 may include a single module (e.g., a single high-capacity tube trailer) that contains, houses, or stores each of the hydrogen tanks 722. In some implementations, the storage module 720 may include multiple submodules that are coupled, linked, or stacked together. For example, the submodules may include high-capacity tube trailers (e.g., 20 ft trailers or 40 ft trailers). In some implementations, any combination of smaller or larger storage submodules may be included in the storage module 720. In certain implementations, the submodules may include 20 ft or 40 ft trailers that may include smaller subassemblies (e.g., racks, shelves, housings, etc.), each of which store a set of the hydrogen tanks 722.

As described above, in some embodiments, the storage module 720 can be and/or can have a modular configuration allowing the storage module 720 to removably couple to the mobile platform 710. In some instances, such an arrangement can allow the storage module 720 to be replaced, for example, when the hydrogen tanks 722 are running low or drop below a threshold quantity, pressure, etc. In some implementations, the mobile platform 710 can provide an indication of the amount, pressure, and/or fill level of the hydrogen tanks 722 in the storage module 710. In some implementations, the replacement of the storage module 720 (e.g., replacing an empty or nearly empty module with a full module) can be performed in an autonomous or at least semi-autonomous process.

The mobile platform 710 can include any number of compressors 734. The compressor(s) 734 can be any suitable shape, size, and/or configuration. As described above with reference to the mobile platform 110 shown in FIG. 1A, in some embodiments, the compressors 734 can be included in a compression module (e.g., the compression module 133) or similar module or assembly. In some embodiments, the compressors 734 can be similar to and/or substantially the same as some known compressors (e.g., diaphragm compressors, rotary compressors, and/or the like) configured to compress or pressurize the hydrogen received from the hydrogen tanks 722. In some implementations, each of the compressors 734 may be configured to pressurize the hydrogen to the same pressure. In some implementations, one or more of the compressors 734 may be configured to pressurize the hydrogen gas to different pressures, for example, corresponding to various inlet hydrogen pressure demands for various hydrogen power plants, as described above with reference to the compressors 134.

In some embodiments, the compressors 734 can be, for example, a high-pressure compressor configured to receive an input flow of a pressurized gas and to provide an output flow of compressed/high-pressure gas at a higher pressure than the input flow of gas. In some implementations, for example, the compressors 734 can receive a flow of hydrogen gas having a pressure between about 200 bar and 400 bar and can output a flow of high-pressure hydrogen gas (or liquid hydrogen) having a pressure between about 400 bar and 1,000 bar.

The compressors 734 may be configured to provide an output flow of high-pressure hydrogen gas (or liquid hydrogen) to one or more components, modules, interfaces, etc. of the mobile platform 710 such as, for example, one or more chillers 736 and/or the refueling interface 740. In some instances, a high-pressure flow of hydrogen may be desirable as it can be used to produce a flow of hydrogen having a relatively high volumetric flow rate (e.g., about 4 kg/min or compressed hydrogen gas), which in turn, can reduce refueling times and increase utilization of the equipment having the hydrogen powerplant (e.g., the hydrogen powerplant 106 described above). As such, the compressor(s) 734 can be substantially similar to the compressors 134 and/or 334 described in detail above.

The mobile platform 710 can include any number of chillers 736. The chillers 736 can be any suitable shape, size, and/or configuration. In some embodiments, the chillers 736 can be similar to and/or substantially the same as some known chillers configured to cool a flow of fluid or gas. For example, in some embodiments, the chillers 736 can include a pump configured to transport a heat transfer fluid such as a refrigerant (e.g., R-22, R-290, R-134a, R-450A, etc.) between a location where the heat transfer fluid is in thermal contact with the hydrogen received from the compressors 734 and a heat sink (e.g., a radiator) so as to remove heat from the hydrogen.

The chillers 736 may be configured to receive a flow of high-pressure hydrogen having a first temperature from the compressors 734 (or a manifold therebetween), and to deliver to the refueling interface 740 a flow of high-pressure hydrogen having a second temperature lower than the first temperature. In some instances, the chillers 736 can provide a flow of cooled high-pressure hydrogen to, for example, the refueling interface 740 and/or the power module 750. For example, the power module 750 can include a hydrogen powerplant and the chiller 736 can provide a flow of hydrogen that can refuel the power module 750 providing electric power to the mobile platform 710 (e.g., a self-contained, self-powered system). In some embodiments, the chiller 736 can be, for example, a gas chiller configured to receive an input flow of a pressurized gas, to cool the high-pressure gas substantially without changing a pressure thereof (e.g., an isobaric process), and to provide an output flow of cold, high-pressure gas at a lower temperature than a temperature of the input flow of gas.

By way of example, the chiller(s) 736 can receive from the compressor(s) 734 a flow of hydrogen gas having a pressure between about 200 bar and 400 bar and a temperature between about 0 degrees Celsius (° C.) and −80° C. The chiller 736 can cool the flow hydrogen gas and can provide to the refueling interface 740 an output flow of cooled, high-pressure hydrogen gas having a pressure between about 400 bar and 1,000 bar and a temperature between about 0° C. and −80° C. In some embodiments, the chiller 736 can be selected, designed, adjusted, and/or configured to provide to the refueling interface 740 (or the power module 750) a flow of hydrogen gas having any suitable pressure and/or temperature.

The mobile platform 710 can include one or more refueling interfaces 740. The refueling interface(s) 740 can be any suitable shape, size, and/or configuration. In some implementations, the refueling interface 740 can include one or more couplers, manifolds, hoses, nozzles, regulators, etc. configured to allow the refueling interface 740 to engage at least one of a refueling infrastructure or a refueling interface of the hydrogen powerplant and to transfer a flow of hydrogen gas thereto. In some implementations, the refueling interface 740 can include any suitable component configured to allow a flow of hydrogen gas having a high volumetric flow rate suitable for transferring relatively large volumes of hydrogen gas to storage tanks or the like associated with at least one of the refueling infrastructure and/or the hydrogen powerplant being refueled. In some implementations, the refueling interface 740 can be configured to provide a flow of hydrogen gas to the power module 750.

The mobile platform 710 can include any number of power modules 750. The power modules 750 can be any suitable shape, size, and/or configuration. In some embodiments, the power modules 750 can have a modular configuration and/or the like allowing one or more power modules 750 to be handled relative to the mobile platform 710 independently. For example, in implementations including multiple power modules, if one power module 750 requires maintenance, service, and/or replacement, such an arrangement can allow that power module 750 to be replaced substantially without impacting the operation of other power modules 750 or other modules of the mobile platform 710. As shown in FIG. 7, the power module 750 is disposed on an elevated platform 752 that is axially displaced from the mobile platform 710. In other embodiments, the power module 750 may be disposed at any suitable location on the mobile platform 710, for example, adjacent to the storage module 720, the compressors 734, the chillers 736, and/or the refueling interface 740.

In some embodiments, the power module 750 can be and/or can include, for example, one or more hydrogen powerplants and can be configured to receive a flow of hydrogen gas/fuel directly from the chillers 736 (or via a manifold or interface therebetween). In some implementations, the power module 750 can include a hydrogen tank similar to and/or substantially the same as one or more of the hydrogen tanks 722 included in the storage module 720. As such, the hydrogen tank can receive a flow of hydrogen gas/fuel from the chillers 736, the refueling interface 740, and/or the like and, in turn, can supply the power module 750 with the hydrogen gas/fuel. In some implementations, the power module 750 can receive a flow of hydrogen directly from one or more hydrogen tanks 722 in the storage module (or via a manifold or interface therebetween). In other embodiments, the power module 750 can be any suitable power generator other than a hydrogen powerplant.

The power module 750 is configured to provide electric power to at least the compressors 734 and chillers 136. In some implementations, the power module 750 can also provide electric power to the storage module 720, the refueling interface 740, the vehicle interface 760, and/or any other component, module, system, and/or the like. For example, in some implementations, a mobile platform 710 can be operated at a refueling location or the like at an industrial work site such as a mining site or the like. In some such implementations, the power module 750 can provide a flow of electric power operable to power one or more components of the refueling location (e.g., a lighting system, a refueling infrastructure, and/or any other components).

In some implementations, the power module 750 can provide a flow of electric power to the vehicle via the vehicle interface 760. For example, in some implementations, the power module 750 can output a flow of electric power operable to electrically power one or more electric and/or electronic components of the vehicle interface 760. In addition or alternatively, the power module 750 can provide a flow of electric power to a vehicle that may be coupled to the mobile platform 710 (e.g., via the vehicle interface 760) operable to electrically power the vehicle. That is to say, in some implementations, the vehicle coupled to the mobile platform 710 can be electrically powered by the power module 750 of the mobile platform 710.

Figure 8:
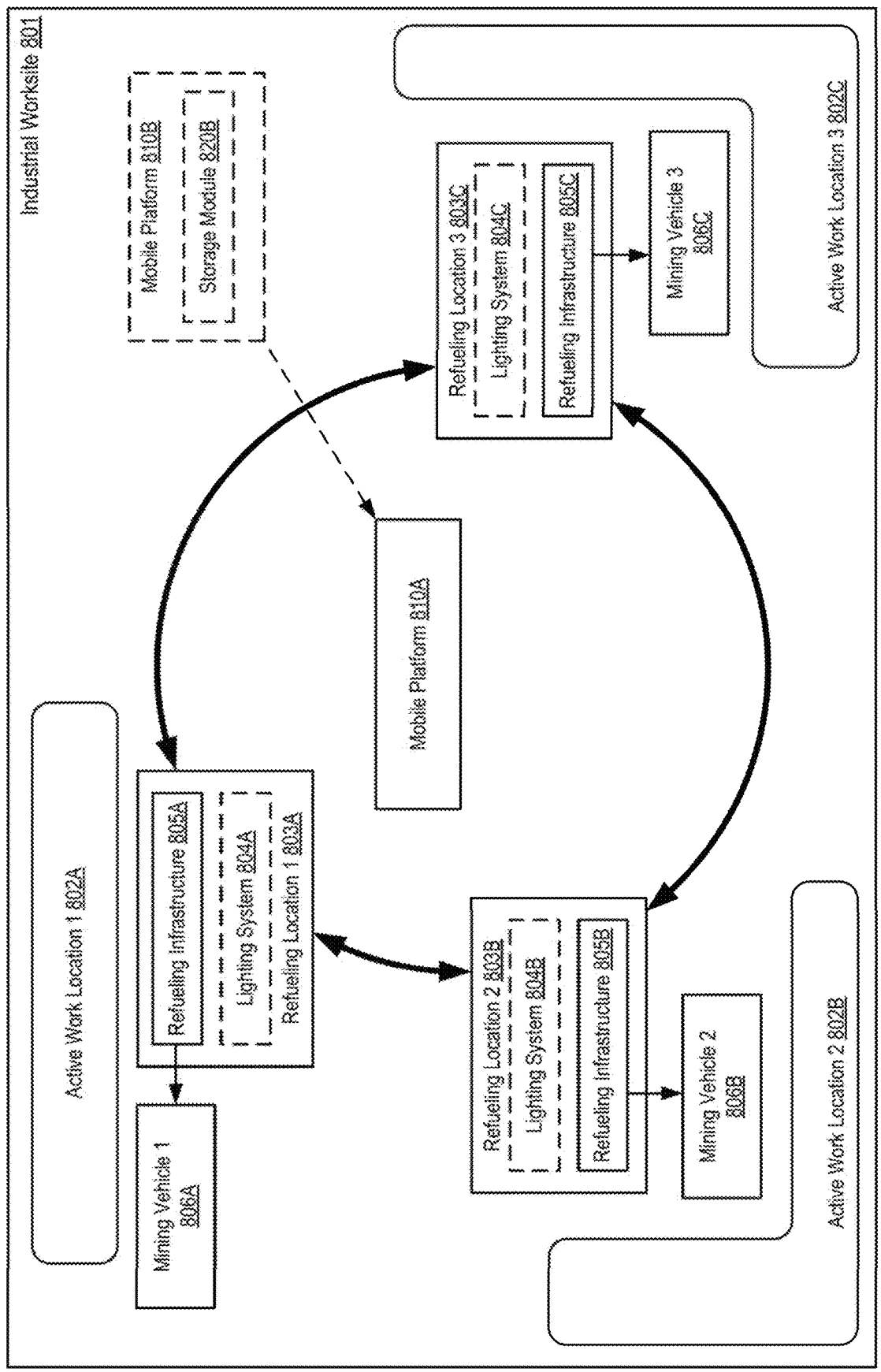
FIG. 8 is a schematic illustration of an industrial worksite implementing a mobile hydrogen refueling system according to an embodiment.
Figure 9:
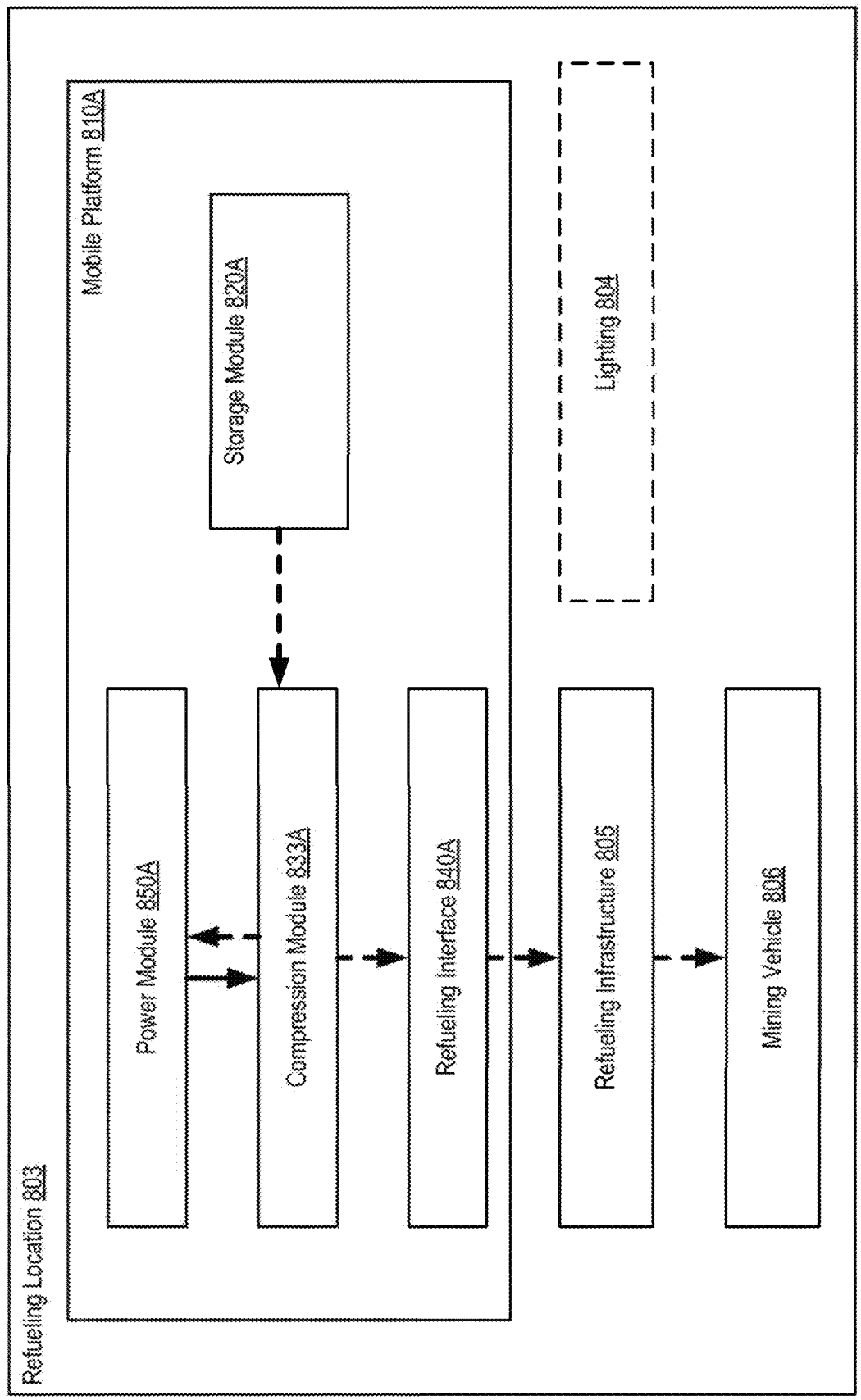
FIG. 9 is a schematic illustration of a refueling location included in the industrial worksite of FIG. 8.

FIGS. 8 and 9 are schematic illustrations of an industrial worksite 801 ("work site") and a refueling location 803 at the work site, respectively, according to an embodiment. In this example, the work site 801 includes, operates, and/or implements a first mobile hydrogen refueling platform ("first platform") 810A and, optionally, a second mobile hydrogen refueling platform 810B ("second platform"). In some embodiments, the worksite 801 may be and/or may include a mining site, for example, quartz, gravel, mica, gold, silver, uranium, copper, iron ore, coal, or any other suitable mining site. The mining site 801 includes multiple active work locations and multiple refueling locations. A number of hydrogen-powered mining vehicles may be present on or at the mining site 801, with each mining vehicle being operated in part at one or more work locations.

For example, as seen in FIG. 8 the industrial worksite 801 includes a first mining vehicle 806A operating at a first active work location 802A, a second mining vehicle 806B operating at a second active work location 802B, and a third mining vehicle 806C operating at a third active work location 802C (collectively referred to as "mining vehicles 806" and "active work locations 802," respectively). The active work locations 802 may correspond to specific locations within the industrial worksite 801 where work (e.g., mining, excavation, loading/unloading, hauling, etc.) is being actively performed. Such locations may include, for example, an in-pit loading area, overburden dumping area, ore processing area and/or stockpile(s), and/or the like. While three active work locations 803 are shown in FIG. 8, it should be understood that the worksite 801 can include any number of active work locations 802 (e.g., four, five, six, seven, eight, nine, ten, fifteen, twenty, thirty, forty, fifty, or more).

Each of the mining vehicles 806 may be involved in performing mining operations at the respective work locations 802. For example, in some implementations, the mining vehicles 806 may be, for example, mining haul trucks configured to be loaded/unloaded at a work location 802 as well as to transport material between one or more active work locations 802 and/or any other location on or off the worksite 801. In some implementations, one or more of the mining vehicles 806 may be a mining haul truck, a hydraulic mining shovel, a large dozer, an electric rope shovel, a rotary drill rig, a rock rig, a motor grader, a large wheel loader, one or more draglines, a wheel tractor scraper, an underground or above ground mining loader, or any other suitable mining vehicle described herein that includes a hydrogen powerplant.

As shown in FIG. 8, the mining site 801 includes a first refueling location ("refueling location 1") 803A, a second refueling location ("refueling location 2") 803B, and a third refueling location 803C ("refueling location 3"), which are collectively referred to herein as "refueling locations 803". Each of the refueling locations 803A, 803B, 803C includes a refueling infrastructure 805A, 805B, 805C (collectively "805") configured to engage and/or interface with a hydrogen powerplant (e.g., the hydrogen powerplant 106 described above with reference to FIG. 1A) that may be included in the mining vehicles 806. In some implementations, the refueling infrastructure 805 can include one or more storage tanks or the like configured to receive, at least store, and provide hydrogen gas. In other implementations, the refueling infrastructure 805 can be one or more components allowing engagement between a refueling interface between a hydrogen source (e.g., the mobile platform 810A or the like) and a refueling interface of one or more hydrogen powerplants included in the mining vehicle 806. In addition, each of the refueling locations 803 may optionally include a lighting system 804A, 804B, 804C (collectively "804") for providing lighting to the refueling location 803. The lighting systems 804 may include LED lights, fluorescent lights, halogen lights, incandescent lights, or any other suitable lights to illuminate the refueling location 803 and/or a surrounding area so as to allow worker visibility, and/or allow 24-hour operation by illuminating the refueling locations 803 during nighttime or if the refueling location 803 is underground or otherwise poorly lit.

In some implementations, each refueling location 803 may be within a predetermined distance from a respective active work location 802. For example, as shown in FIG. 8, the first refueling location 803A is located proximate to the first active work location 802A, the second refueling location 803B is located proximate to the second active work location 802B, and the third refueling location 803C is located proximate to the third active work location 802C. In some implementations, the locations of the refueling locations 803 relative to the active work locations 802 is selected and/or configured to increase or substantially maximize utilization of the mining vehicles 806. In some implementations, the refueling locations 803 can be, for example, at least semi-permanent structures that can remain in a desired position as long as work is performed at the corresponding active work location 802. In other implementations, the refueling locations 803 may be mobile and/or movable structures that can be readily moved to desired locations at the worksite 801.

As shown in FIGS. 8 and 9, the worksite 801 includes, uses, and/or implements the first mobile hydrogen refueling platform 810A and optionally, a second mobile hydrogen refueling platform 810B. As described above with reference to the mobile platforms 110, 310, 410, 510, 610, and/or 710, the mobile refueling platforms 810A and/or 810B may designed and/or configured for use at the mining site 801. For example, the mobile platforms 810A and/or 810B may have a size that exceeds at least one constraint associated with traveling on a highway. In addition, the mobile platforms 810A and/or 810B may be designed for operation in rough, uneven, unpaved, and/or steep environments such as those encountered at mining sites or other heavy industrial work sites (e.g., the mobile platforms 810A and/or 810B can be "ruggedized"). For example, the mobile platforms 810A and/or 810B may be integrated into and/or at least temporarily coupled to a mining haul truck (e.g., corresponding to any of the vehicles 102, 202, 302, 402, 502, and/or 602, and/or any other vehicle described herein). In some instances, the mining haul truck can be operable to move at least the mobile platform 810A on, at, and/or along the worksite 801 such as, for example, to, from, or between the refueling locations 803A, 803B, and 803C, as indicated by thick arrows shown in FIG. 8. In some instances, the second mobile platform 810B may also be movable around the worksite 801, for example, to refuel the first mobile platform 810A, as described in further detail herein.

FIG. 9 is a schematic block diagram of a refueling location 803 (e.g., the first refueling location 803A, the second refueling location 803B, or the third refueling location 803C). The first mobile platform 810A is shown at and/or engaged with the refueling location 803 to provide a flow of hydrogen to a mining vehicle 806 (e.g., the first mining vehicle 806A, the second mining vehicle 806B, or the second 806C) also at the refueling location 803 and at least temporarily coupled to and/or engaged with the refueling infrastructure 805 thereof. As shown, the mobile platform 810A can include any number of components, modules, interfaces, etc., such as any of those previously described herein. For example, the mobile platform 810A may include at least a storage module 820A, a compression module 833A, and a refueling interface 840A, and a power module 850A.

The power module 850A of the mobile platform 810A may include a hydrogen powerplant configured to provide electric power to the mining haul truck (e.g., the vehicle 102, 202, 302, 402, 502, and/or 602) coupled to the mobile platform 810A. In some implementations, the power module 850A may include one or more hydrogen tanks, and may be configured to receive a flow of hydrogen from the refueling interface 840A or directly from the compression module 833A and/or the storage module 820A. As described in detail above, the power module 850A may be included in and/or disposed on the mobile platform 810A (e.g., the trailer or other support structure of the mobile platform 810A) or, in addition or as an alternative, may be a power module included in the mining haul truck to which the mobile platform 810A is coupled (e.g., the power module 850A can be a hydrogen power plant similar to and/or substantially the same as the hydrogen power plants included in the mining vehicles 806. In some embodiments, the power module 850A may be similar to and/or substantially the same as the power modules 150, 450, 550, 650, and/or 750, and/or any other power module described herein. As such, the power module 850A can generate electrical power operable to power the mobile platform 810A and/or the mining haul truck used to move the mobile platform 810A.

The storage module 820A is configured to store, contain, or house a plurality of hydrogen tanks having a combined capacity greater than, for example, the hydrogen consumption of at least two mining vehicles 806 within a 24-hour period (e.g., up to 10,000 kg of hydrogen or more at a pressure between about 200 bar and about 400 bar, inclusive). For example, in some implementations, the storage module 820A may be similar to or substantially the same as the storage modules 120, 320, 420, 520, 620, and/or 720 described in detail above.

The compression module 833A may be configured to receive a flow of hydrogen from one or more of hydrogen tanks included in the storage module 820A, for example, via a manifold (e.g., the manifold 132) and to provide a flow of high-pressure hydrogen to the refueling interface 840A, the flow of high-pressure hydrogen having a second pressure, for example, between about 400 bar and about 1,000 bar, inclusive. In some implementations, the compression module 833A may include at least a compressor (e.g., the compressor 134, 734) and a chiller (e.g., the chiller 136, 736) fluidically coupled between the compressor and the refueling interface 840A. The compressor may be configured to compress the flow of hydrogen and to provide the flow of high-pressure hydrogen to the refueling interface after the flow of high-pressure hydrogen has been cooled by the chiller. Each of the compressors and the chillers may be powered by the power module 850A. In some implementations, the flow of high-pressure hydrogen provided to the refueling interface 840A from the compression module 833A is a first flow of high-pressure hydrogen, and the power module 850A may be configured to receive a second flow of high-pressure hydrogen from the compression module 833A after the second flow is cooled by the chiller. Thus, the compression module 833A may be configured to provide high pressure, cooled hydrogen to the refueling interface 840A and/or the power module 850A.

As shown in FIG. 9, the refueling interface 840A can include any suitable components, connectors, valves, hoses, tubes, pipes, pumps, etc. to allow the refueling interface 840A to engage, couple to, and/or interface with the refueling infrastructure 805. In some embodiments, the refueling interface 840A may be similar to or substantially that same as the refueling interface 140, 340, 440, 540, 640, and/or 740, and/or any other suitable refueling interface described herein. As such, the refueling interface 840A may be configured to convey a flow of hydrogen from the mobile platform 810A (e.g., the storage module 820A of the mobile platform 810A) to the refueling infrastructure 805 at the refueling location 803 when a mining vehicle 806 is present at the refueling location and coupled to and/or otherwise engaged with the refueling infrastructure 805. The flow of hydrogen may selectively have a second pressure greater than the first pressure, as previously described. In some implementations, the second pressure may be between 400 bar and 1,000 bar, inclusive. In some implementations, the refueling interface 840A may be configured to convey the second flow of hydrogen from the compression module 833A to the refueling infrastructure 805 with a volumetric flowrate of at least 4 kg/min.

Referring back to FIG. 8, the second mobile platform 810B may be coupled to a mining haul truck (e.g., the vehicle 102, 202, 302, 402, 502, and/or 602) operable to move the second mobile platform 810B on, along, and/or around the worksite 801. The second mobile platform 810B includes at least a storage module 820B that is configured to maximize storage. For example, second mobile platform 810B can be similar to the first mobile platform 810A but can be configured to maximize an amount of hydrogen storage. In some embodiments, for example, the storage module 820B may be configured to store 2×, 3×, 4×, 5×, 6×, 7×, 8×, 9×, 10×, or more of the amount of hydrogen that is or can be stored by the storage module 820A of the first mobile platform 810A. In some implementations, the mobile platform 810B may be substantially similar to the mobile platform 110A or 610 as previously described in detail herein.

As shown in FIG. 8, the second mobile platform 810B may be movable to or from at least one refueling location 803 (e.g., the first refueling location 803A, the second refueling location 803B, and/or the third refueling location 803C) to provide hydrogen to the first mobile platform 810A. Although not shown, the second mobile platform 810B may also include a refueling interface (e.g., the refueling interface 140A, 640) that is configured to engage and/or interface with a portion of the first mobile platform 810A to allow a transfer of hydrogen from the storage module 820B of the second mobile platform 810B to at least one hydrogen tank in the storage module 820A of the first mobile platform 810A. In this manner, while the first mobile platform 810A is used to refuel the mining vehicles 806 at a corresponding refueling location 803, the second mobile platform 810B can be used to refuel the hydrogen tanks of the storage module 820A of the first mobile platform 810A. In some implementations, the refueling of the storage module 810A of the first mobile platform 810A by the second mobile platform 810B may also be performed at one of the refueling locations 803. In other implementations, the refueling of the storage module 810A of the first mobile platform 810A can be performed at any suitable location of the worksite 801 or can be performed at a location off or outside of the worksite 801.

Figure 10:
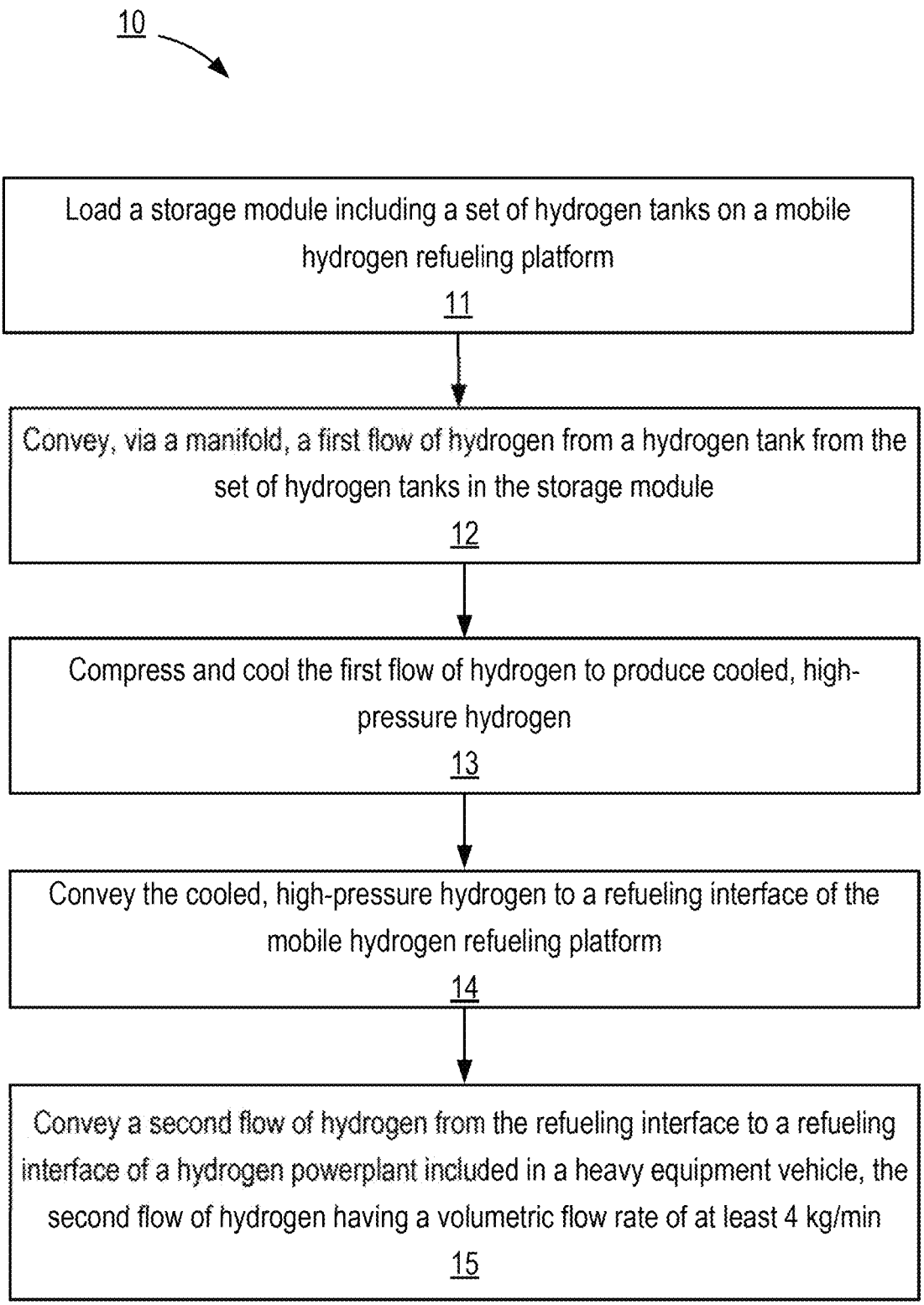
FIG. 10 is a flowchart illustrating a method of using a mobile hydrogen refueling system according to an embodiment.

FIG. 10 is a flowchart illustrating a method 10 of using a mobile hydrogen refueling system according to an embodiment. The mobile hydrogen refueling system can be similar to or substantially the same as, for example, the systems 100, 300, 400, 500, 600, 700, and/or 800 described in detail above. While described with respect to the system 100, it should be appreciated that the operations of the method 10 may be performed with any of the mobile hydrogen refueling systems described herein, or any other suitable mobile hydrogen refueling systems.

The method 10 includes loading a storage module including any number of hydrogen tanks on a mobile hydrogen refueling system, at 11. The mobile hydrogen refueling platform has a size that exceeds at least one constraint associated with traveling on a highway. For example, the storage module 120 storing, containing, or housing the set of hydrogen tanks 122 is loaded on the mobile platform 110. The mobile platform 110 is coupled to a mining truck 102 that is operable to move the mobile platform to or from the at least one refueling location (e.g., the refueling locations 803) at a mining site (e.g., the industrial worksite 801). In some implementations, the storage module 120 may be loaded with multiple hydrogen tanks 122 together containing 1,000 kg, 2,000 kg, 3,000 kg, 4,000 kg, 5,000 kg, 6,000 kg, 7,000 kg, 8,000 kg, 9,000 kg, 10,000 kg, 15,000 kg, inclusive, or more of hydrogen.

A first flow of hydrogen is conveyed from a hydrogen tank 122 of the set of hydrogen tanks 122 included in the storage module 120 via the manifold 132, at 12. For example, the first flow of hydrogen may be communicated to the one or more compressors 134 included in the mobile platform 110. In some implementations, the first flow of hydrogen is at a first pressure between 200 bar and 400 bar, inclusive of any value or range therebetween.

The first flow of hydrogen is compressed and cooled to produce cooled, high-pressure hydrogen, at 13. For example, the compressor(s) 134 may receive the first flow of hydrogen gas from the manifold 132 and compress the hydrogen gas to pressurize the hydrogen gas. The pressurized hydrogen gas can then be communicated to the chiller(s) 136 that cool the hydrogen gas, thus producing the cooled, high-pressure hydrogen gas.

The cooled, high-pressure hydrogen is conveyed to the refueling interface 140 of the mobile platform 110, at 14. For example, the first flow of hydrogen that has been compressed by the compressor 134 and cooled by the chiller 136 is conveyed to the refueling interface 140 of the mobile platform. At 15, a second flow of hydrogen is conveyed from the refueling interface 140 of the mobile platform 110 to a refueling interface of a hydrogen power plant included in a heavy equipment vehicle. In some implementations, the heavy equipment truck may include a mining truck, for example, the mining vehicle 806. In some implementations, the second flow of hydrogen may be at a second pressure between 400 bar and 1,000 bar, inclusive of any value or range therebetween. In some instances, the relatively high pressure of the second flow of hydrogen can allow and/or can result in the second flow of hydrogen having a volumetric flow rate of at least 4 kg/min.

In some embodiments, the mobile platform 110 may include a power module 150 that is configured to provide electric power to at least the compressor 134 and the chiller 136 of the mobile platform 810. The power module 150 may include a hydrogen powerplant. In such embodiments, the method 10 may also include conveying a third flow of hydrogen from the chiller 136 to the hydrogen powerplant included in the power module 150, which is used by the power plant 150 to generate electricity.

While various embodiments have been particularly shown and described, it should be understood that they have been presented by way of example only, and not limitation. Various changes in form and/or detail may be made without departing from the spirit of the disclosure and/or without altering the function and/or advantages thereof unless expressly stated otherwise. Where schematics and/or embodiments described above indicate certain components arranged in certain orientations or positions, the arrangement of components may be modified.

Although various embodiments have been described as having particular features and/or combinations of components, other embodiments are possible having a combination of any features and/or components from any of embodiments described herein, except mutually exclusive combinations. The embodiments described herein can include various combinations and/or sub-combinations of the functions, components, and/or features of the different embodiments described.

The specific configurations of the various components can also be varied. For example, the size and specific shape of the various components can be different from the embodiments shown, while still providing the functions as described herein. More specifically, the size and shape of the various components can be specifically selected for a desired or intended usage. Thus, it should be understood that the size, shape, and/or arrangement of the embodiments and/or components thereof can be adapted for a given use unless the context explicitly states otherwise.

Where methods and/or events described above indicate certain events and/or procedures occurring in certain order, the ordering of certain events and/or procedures may be modified. Additionally, certain events and/or procedures may be performed concurrently in a parallel process when possible, as well as performed sequentially as described above.

What is claimed:

1. A method, comprising:

loading a storage module including a plurality of hydrogen tanks on a mobile hydrogen refueling platform, the mobile hydrogen refueling platform including a power module having a hydrogen powerplant, the power module configured to provide electric power to at least a compressor and a chiller of the mobile hydrogen refueling platform, the mobile hydrogen refueling platform having a size that exceeds at least one constraint associated with traveling on a highway;

conveying, via a manifold, a first flow of hydrogen from a hydrogen tank from the plurality of hydrogen tanks in the storage module;

compressing and cooling the first flow of hydrogen to produce cooled, high-pressure hydrogen;

conveying the cooled, high-pressure hydrogen to a refueling interface of the mobile hydrogen refueling platform;

conveying a second flow of hydrogen from the refueling interface of the mobile hydrogen refueling platform to a refueling interface of a hydrogen powerplant included in a heavy equipment vehicle, the second flow of hydrogen having a volumetric flow rate of at least 4 kg/min; and conveying a third flow of hydrogen from the chiller to the hydrogen powerplant included in the power module.

2. The method of claim 1, wherein the heavy equipment vehicle is a mining truck.

3. The method of claim 1, wherein the mobile hydrogen refueling platform is coupled to a mining truck operable to move the mobile hydrogen refueling platform to or from the at least one refueling location at a mining site.

4. The method of claim 1, wherein the loading the storage module includes loading the storage module with the plurality of hydrogen tanks containing more than 10,000 kilograms (kg) of hydrogen.

5. The method of claim 1, wherein the first flow of hydrogen is at a first pressure between 200 bar and 400 bar.

* * * * *